United States Patent
Yao et al.

(10) Patent No.: US 12,101,154 B2
(45) Date of Patent: Sep. 24, 2024

(54) TRANSMISSION METHOD AND DEVICE, AND COMPUTER READABLE STORAGE MEDIUM

(71) Applicant: ZTE CORPORATION, Guangdong (CN)

(72) Inventors: Ke Yao, Shenzhen (CN); Bo Gao, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 290 days.

(21) Appl. No.: 17/584,890

(22) Filed: Jan. 26, 2022

(65) Prior Publication Data

US 2022/0329307 A1    Oct. 13, 2022

Related U.S. Application Data

(63) Continuation of application No. PCT/CN2020/104758, filed on Jul. 27, 2020.

(30) Foreign Application Priority Data

Jul. 30, 2019    (CN) .......................... 201910711336.1

(51) Int. Cl.
*H04B 7/06* (2006.01)
*H04L 5/00* (2006.01)
*H04W 52/36* (2009.01)

(52) U.S. Cl.
CPC ......... *H04B 7/0639* (2013.01); *H04L 5/0051* (2013.01); *H04W 52/367* (2013.01)

(58) Field of Classification Search
CPC .. H04B 7/0639; H04B 7/0426; H04B 7/0623; H04B 7/0456; H04B 7/0465; H04B 7/0478; H04L 5/0051; H04W 52/367
See application file for complete search history.

(56) References Cited

U.S. PATENT DOCUMENTS

| | | | |
|---|---|---|---|
| 11,700,601 B2* | 7/2023 | Lee | H04W 52/367 370/329 |
| 2017/0264402 A1 | 9/2017 | Papasakellariou | |
| 2019/0182001 A1 | 6/2019 | Lee et al. | |
| 2020/0154364 A1* | 5/2020 | Rahman | H04B 7/0404 |
| 2021/0258886 A1* | 8/2021 | Sun | H04W 52/146 |
| 2022/0279492 A1* | 9/2022 | Park | H04B 7/0628 |

(Continued)

FOREIGN PATENT DOCUMENTS

| | | |
|---|---|---|
| CN | 102783226 A | 11/2012 |
| CN | 103037489 A | 4/2013 |

(Continued)

OTHER PUBLICATIONS

Extended European Search Report for EP Appl. No. 20847153.2, dated Jul. 19, 2023 (9 pages).

(Continued)

*Primary Examiner* — Julio R Perez
(74) *Attorney, Agent, or Firm* — Foley & Lardner LLP

(57) ABSTRACT

Disclosed are a transmission method and device, and a computer readable storage medium. The transmission method includes steps described below. A transmission mode of a first communication node is determined; at least one of a codebook or a transmission power ratio is determined according to the transmission mode; and a transmission is sent according to at least one of the codebook or the transmission power ratio.

14 Claims, 4 Drawing Sheets

(56) References Cited

U.S. PATENT DOCUMENTS

| | | | | |
|---|---|---|---|---|
| 2022/0329307 A1* | 10/2022 | Yao | ................... | H04B 7/0639 |
| 2023/0180150 A1* | 6/2023 | Nadakuduti | ........ | H04W 52/346 |
| | | | | 455/522 |
| 2023/0180151 A1* | 6/2023 | Nadakuduti | ........ | H04W 52/228 |
| | | | | 370/318 |
| 2023/0276497 A1* | 8/2023 | Chande | ............ | H04W 74/0866 |
| | | | | 370/329 |
| 2023/0397130 A1* | 12/2023 | Nadakuduti | ........ | H04W 52/367 |
| 2024/0077165 A1* | 3/2024 | Ehsani | ................... | F16L 55/17 |

FOREIGN PATENT DOCUMENTS

| | | |
|---|---|---|
| CN | 104936162 A | 9/2015 |
| CN | 108112065 A | 6/2018 |
| CN | 109151969 A | 1/2019 |
| CN | 110035484 A | 7/2019 |
| CN | 110535508 A | 12/2019 |
| WO | WO-2013/164024 A1 | 11/2013 |

OTHER PUBLICATIONS

Samsung, "Enhancements on MIMO for NR" 3GPP TSG RAN Meeting #84, RP-191187, Jun. 7, 2019, Newport Beach, USA (17 pages).

Vivo, "Feature lead summary on Full TX Power IL transmission", 3GPP TSG RAN WG1 #97, R1-1907671, May 17, 2019, Reno, USA (20 pages).

International Search Report and Written Opinion for PCT Appl. No. PCT/CN2020/104758, mailed Oct. 22, 2020 (with English translation, 9 pages).

Office Action for CN Appl. No. 2022111389588, dated Sep. 14, 2023 (with English translation, 15 pages).

Vivo, "Further discussion on full Tx power in UL transmission", 3GPP TSG RAN WG1#96bis, R1-1904098, Apr. 12, 2019, Xi'an, China (4 pages).

ZTE et al., "Codebook based UL transmission", 3GPP TSG RAN WG1 Meeting 90bis, R1-1717417, Oct. 13, 2017, Prague, CZ (6 pages).

ZTE, "Full TX Power UL transmission", 3GPP TSG RAN WG1 Meeting #97, R1-1907561, May 17, 2019, Reno, USA (11 pages).

Li et al., "Implementation of DCI Format Detection and Transmission Scheme Confirmation of PDSCH in LTE System", Video Engineering, 2013, 37(17), China Academic Journal Electronic Publishing House (6 pages).

Xu et al., "The Research of UL Power Controlling on TD-LTE System", Information Network Security, 2013, 1671-1122, China Academic Journal Electronic Publishing House (3 pages).

* cited by examiner

TRANSMISSION METHOD AND DEVICE, AND COMPUTER READABLE STORAGE MEDIUM

CROSS-REFERENCE TO RELATED APPLICATIONS

This application claims the benefit of priority under 35 U.S.C. § 120 as a continuation of PCT Patent Application No. PCT/CN2020/104758, filed on Jul. 27, 2020, which claims priority to Chinese Patent Application No. 201910711336.1 filed with the CNIPA on Jul. 30, 2019, the disclosure of each of which is incorporated herein by reference in its entirety.

TECHNICAL FIELD

The present application relates to radio communication networks, for example, a transmission method and device, and a computer readable storage medium.

BACKGROUND

With the continuous development of communication technologies, the component performance of radio communication devices is increasingly improved, and the next generation mobile communication system is likely to be equipped with multiple high-performance antennas. However, in multi-antenna technologies, the maximum transmission power capability of a sending device cannot be utilized when part of antennas are used to send the transmission. For example, a sending device that supports at most two antennas can only use half the maximum transmission power of the sending device if only one antenna is used to send.

SUMMARY

The present application provides a transmission method and device, and a computer readable storage medium. Therefore, the transceiving performance of an antenna can be enhanced, at the same time, multiple types of communication nodes are adapted, and the versatility is improved.

An embodiment of the present application provides a transmission method. The transmission method includes steps described below.

A transmission mode of a first communication node is determined.

At least one of a codebook or a transmission power ratio is determined according to the transmission mode.

A transmission is sent according to the at least one of the codebook or the transmission power ratio.

An embodiment of the present application provides a transmission method. The transmission method includes steps described below.

A transmission sent by a first communication node according to at least one of a codebook or a transmission power ratio is received; where the at least one of the codebook or the transmission power ratio is determined by the first communication node according to a transmission mode of the first communication node.

An embodiment of the present application provides a transmission device. The transmission device includes a processor, which is configured to, when executing a computer program, implement the transmission method of the above embodiments.

An embodiment of the present application further provides a computer readable storage medium, which is configured to store a computer program which, when executed by a processor, implements the transmission method of the above embodiments.

DETAILED DESCRIPTION

Figure 1:
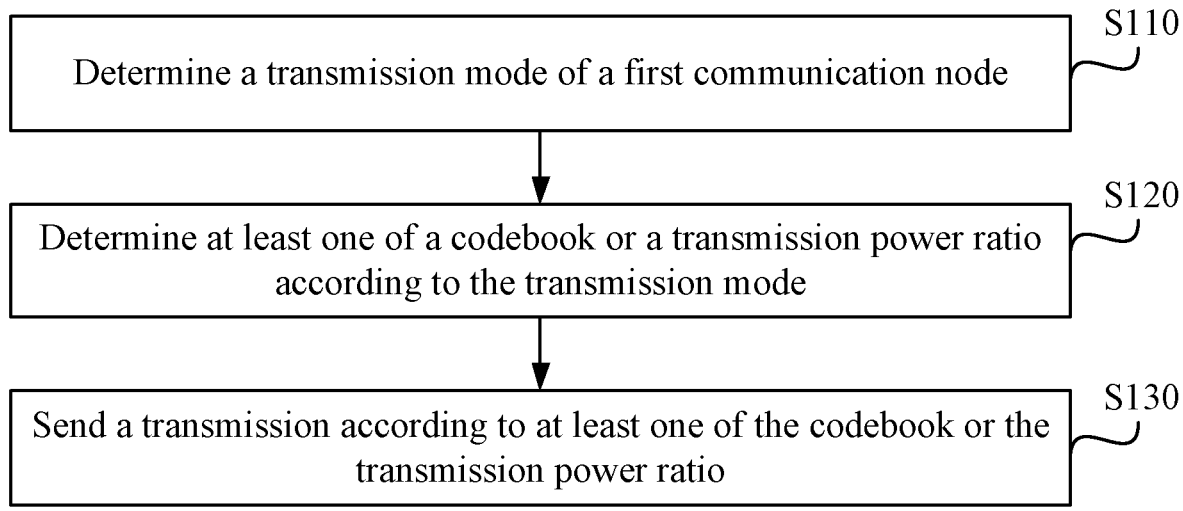
FIG. 1 is a flowchart of a transmission method according to an embodiment.

Embodiments of the present application are described below in conjunction with the drawings.

Generally, a base station may determine the number of antenna ports according to the capability of sending antennas of a user equipment (UE), and may schedule the UE to send a channel sounding reference signal (SRS). The SRS is used for sounding an uplink channel, which is also referred to as channel sounding. After obtaining the channel sounding result, the base station determines multiple-input multiple-output (MIMO) parameters (including the number of layers, precoding, etc.) for a subsequent uplink transmission according to the channel sounding result, and then specifies a determined precoding matrix for the uplink transmission of the UE, that is, a transmitted precoding matrix indicator (TPMI). The UE uses the specified precoding matrix to precode the transmitted data and sends it to the base station.

In a new radio access technology (NR) system, when an uplink transmission is sent in a MIMO multi-antenna manner, the uplink transmission may be divided into a codebook based transmission and a non codebook based transmission. A codebook is a set of predefined codewords, including at least one codeword. Each codeword is a matrix and is configured for precoding of multiple ports of a sending terminal (such as a UE). Therefore, a codeword is also referred to as a precoding matrix. Each row of the codeword matrix represents an antenna port, and each column of the codeword matrix represents one layer (MIMO layer). For example, Table 1 shows a codebook of 2 antenna ports and 1 layer.

TABLE 1

Precoding matrix W using two antenna ports for a single-layer transmission

| TPMI index | W (Ordered from left to right in ascending order of TPMI indices) | | | | | | | |
|---|---|---|---|---|---|---|---|---|
| 0 to 5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

It can be seen from Table 1 that the codebook includes 6 codewords, and each codeword has two rows and one column. Each codeword is identified by a TPMI.

The base station may also configure an SRS resource set for the UE, and the SRS resource set includes at least one SRS resource. The usage of an SRS resource set may be one of beam management, antenna switching, codebook, and non-codebook. The base station schedules the UE to send an SRS resource in the SRS resource set with a usage of codebook or non-codebook for the base station to perform sounding of the uplink channel, which is also referred to as the channel sounding. The base station determines transmission parameters for a subsequent uplink transmission according to channel sounding results. The base station uses the SRS resource set with the usage of codebook to schedule a codebook based uplink transmission, and uses the SRS resource set with the usage of non-codebook to schedule a non codebook based uplink transmission.

The base station may configure different SRS resources for the UE, and the UE sends different SRSs on the different SRS resources, then the base station needs to indicate an SRS resource indicator (SRI) for the uplink transmission. Different SRS resources correspond to different sending beam resources (groups), different antenna panels (groups), or different precoding manners of antenna ports.

For the codebook based transmission, the base station selects appropriate precoding information (that is, the codeword) in a predefined codebook according to the sounded channel, and indicates the precoding information to the UE by using a TPMI.

For the non codebook based transmission, the base station does not need to indicate a TPMI to the UE, but if the UE uses multiple antenna ports, the UE may determine the precoding information for the transmission by itself.

A physical uplink shared channel (PUSCH) transmission as the above uplink transmission is used as an example. When scheduling the PUSCH transmission, the base station uses an SRI field of downlink control information (DCI) of physical layer control signaling to indicate one or more SRS resources in the SRS resource set as a sending parameter reference of the PUSCH transmission. For example, the UE uses SRS resources having the same sending filter parameter and indicated by the base station to send the scheduled PUSCH transmission.

For a codebook based PUSCH transmission, the length of bits for the SRI field in the DCI depends on the number of SRS resources in the SRS resource set. For example, if the number of SRS resources in the SRS resource set is 2, just one bit is required for the SRI field.

According to the number of ports supported by the SRS resource, the DCI further uses a field of precoding information and number of layers to indicate MIMO parameters (such as the number of MIMO layers and the precoding matrix) of the PUSCH transmission.

Exemplarily, Table 2 is used to represent the contents of the field of precoding information and number of layers when the maximum rank (maxrank) of 4 antenna ports is 2, 3, or 4, and different columns respectively correspond to different coherent capabilities.

TABLE 2

Precoding information and the number of layers of 4 antenna ports (transform precoder is disabled and maxrank = 2, 3, or 4)

| Bit field mapped to index | CodebookSubet parameter being fullyAndPartialAndNonCoherent | Bit field mapped to index | CodebookSubset parameter being partialAndNonCoherent | Bit field mapped to index | CodebookSubset parameter being nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12 to 15 reserved | |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |

TABLE 2-continued

Precoding information and the number of layers of 4 antenna ports
(transform precoder is disabled and maxrank = 2, 3, or 4)

| Bit field CodebookSubet mapped parameter being to index fullyAndPartialAndNonCoherent | | Bit field CodebookSubset mapped parameter being to index partialAndNonCoherent | | Bit field CodebookSubset mapped parameter being to index nonCoherent | |
|---|---|---|---|---|---|
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62 to 63 | Reserved | | | | |

As shown in Table 2, there are 62 valid indicators for the field of precoding information and number of layers whose codebookSubset parameter is fullyAndPartialAndNonCoherent, and the size of the field of precoding information and number of layers is 6 bits. There are 32 valid indicators for the field of precoding information and number of layers whose codebookSubset parameter is partialAndNonCoherent, and the size of the field of precoding information and number of layers is 5 bits. There are 12 valid indicators for the field of precoding information and number of layers whose codebookSubset parameter is nonCoherent, and the size of the field of precoding information and number of layers is 4 bits.

Table 3 is used to represent the contents of the field of precoding information and number of layers when the maximum rank of 4 antenna ports is 1, and different columns respectively correspond to different coherent capabilities.

TABLE 3

Precoding information and the number of layers of 4 antenna ports
(transform precoder is enabled or disabled, and maxrank = 1)

| Bit field CodebookSubset mapped parameter being to index fullyAndPartialAndNonCoherent | | Bit field CodebookSubset mapped parameter being to index partialAndNonCoherent | | Bit field CodebookSubset mapped parameter being to index nonCoherent | |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12 to 15 | reserved | | |
| ... | ... | | | | |
| 27 | 1 layers: TPMI = 27 | | | | |
| 28 to 31 | Reserved | | | | |

As shown in Table 3, there are 28 valid indicators for the field of precoding information and number of layers whose codebookSubset parameter is fullyAndPartialAndNonCoherent, and the size of the field of precoding information and number of layers is 5 bits. There are 12 valid indicators for the field of precoding information and number of layers whose codebookSubset parameter is partialAndNonCoherent, and the size of the field of precoding information and number of layers is 4 bits. There are 4 valid indicators for the field of precoding information and number of layers whose codebookSubset parameter is nonCoherent, and the size of the field of precoding information and number of layers is 2 bits.

Table 4 is used to represent the contents of the field of precoding information and number of layers when the maximum rank of 2 antenna ports is 2, and different columns respectively correspond to different coherent capabilities.

TABLE 4

Precoding information and the number of layers of 2 antenna
ports (transform precoder is disabled and maxrank = 2)

| Bit field CodebookSubset mapped parameter being to index fullyAndPartialAndNonCoherent | | Bit field CodebookSubset mapped parameter being to index nonCoherent | |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |

TABLE 4-continued

Precoding information and the number of layers of 2 antenna
ports (transform precoder is disabled and maxrank = 2)

| Bit field CodebookSubset mapped parameter being to index fullyAndPartialAndNonCoherent | | Bit field CodebookSubset mapped parameter being to index nonCoherent | |
|---|---|---|---|
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |

TABLE 4-continued

Precoding information and the number of layers of 2 antenna ports (transform precoder is disabled and maxrank = 2)

| Bit field mapped to index | CodebookSubset parameter being fullyAndPartialAndNonCoherent | Bit field mapped to index | CodebookSubset parameter being nonCoherent |
|---|---|---|---|
| 8 | 2 layers: TPMI = 2 | | |
| 9 to 15 | reserved | | |

As shown in Table 4, there are 9 valid indicators for the field of precoding information and number of layers whose codebookSubset parameter is fullyAndPartialAndNonCoherent, and the size of the field of precoding information and number of layers is 4 bits. There are 3 valid indicators for the field of precoding information and number of layers whose codebookSubset parameter is nonCoherent, and the size of the field of precoding information and number of layers is 2 bits.

Table 5 is used to represent the contents of the field of precoding information and number of layers when the maximum rank of 2 antenna ports is 1, and different columns respectively correspond to different coherent capabilities.

TABLE 5

Precoding information and the number of layers of 2 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |

TABLE 5-continued

Precoding information and the number of layers of 2 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being nonCoherent |
|---|---|---|---|
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6 to 7 | reserved | | |

As shown in Table 5, there are 6 valid indicators for the field of precoding information and number of layers whose codebookSubset parameter is fullyAndPartialAndNonCoherent, and the size of the field of precoding information and number of layers is 3 bits. There are 2 valid indicators for the field of precoding information and number of layers whose codebookSubset parameter is nonCoherent, and the size of the field of precoding information and number of layers is 1 bit.

As it can be seen from the above description, Table 2 and Table 3 are indicators for the field of precoding information and number of layers in the case of 4 antenna ports. A TPMI of 1 layer refers to a precoding matrix corresponding to a TPMI index in Table 6 or Table 7. A TPMI of 2 layers refers to a precoding matrix corresponding to a TPMI index in Table 8. A TPMI of 3 layers refers to a precoding matrix corresponding to a TPMI index in Table 9. A TPMI of 4 layers refers to a precoding matrix corresponding to a TPMI index in Table 10.

TABLE 6

Precoding matrix W using four antenna ports for a single-layer transmission in the case of transform precoder being enabled

| TPMI index | W (Ordered from left to right in ascending order of TPMI indices) |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

TABLE 7

Precoding matrix W using four antenna ports for a single-layer transmission in the case of transform precoder being disabled

| TPMI index | W (Ordered from left to right in ascending order of TPMI indices) |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE 8

Precoding matrix W using four antenna ports for a two-layer transmission in the case of transform precoder being disabled

| TPMI index | W (Ordered from left to right in ascending order of TPMI indices) |
|---|---|
| 0 to 3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4 to 7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8 to 11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12 to 15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |
| 16 to 19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20 to 21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ — — |

TABLE 9

Precoding matrix W using four antenna ports for a three-layer transmission in the case of transform precoder being disabled

| TPMI index | W (Ordered from left to right in ascending order of TPMI indices) | | | |
|---|---|---|---|---|
| 0 to 3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4 to 6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

TABLE 10

Precoding matrix W using four antenna ports for a four-layer transmission in the case of transform precoder being disabled

| TPMI index | W (Ordered from left to right in ascending order of TPMI indices) | | | |
|---|---|---|---|---|
| 0 to 3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

Table 4 and Table 5 are indicators for the field of precoding information and number of layers in the case of 2 antenna ports. A TPMI of 1 layer refers to a precoding matrix corresponding to a TPMI index in Table 1. A TPMI of 2 layers refers to a precoding matrix corresponding to a TPMI index in Table 11.

TABLE 11

Precoding matrix W using two antenna ports for a two-layer transmission in the case of transform precoder being disabled

| TPMI index | W (Ordered from left to right in ascending order of TPMI indices) | | |
|---|---|---|---|
| 0 to 2 | $\frac{1}{\sqrt{2}}\begin{bmatrix}1&0\\0&1\end{bmatrix}$ | $\frac{1}{2}\begin{bmatrix}1&1\\1&-1\end{bmatrix}$ | $\frac{1}{2}\begin{bmatrix}1&1\\j&-j\end{bmatrix}$ |

In the NR system, the non codebook based transmission is supported to utilize the maximum power; but for the codebook based transmission, no efficient solution supports the codebook based transmission to utilize the maximum power. The embodiments of the present application provide a mobile communication network (including but not limited to the fifth-generation mobile communication network (5G)). The network architecture of the network may include network side devices (for example, one or more types of base stations, a transmission node, an access point (AP), a relay, a Node B (NB), universal terrestrial radio access (UTRA), evolved universal terrestrial radio access (EU-TRA), etc.) and terminals (a user, a user equipment data card, a relay, a mobile device, etc.). The embodiments of the present application provide a transmission method and device, and a computer readable storage medium that are capable of operating on the above network architecture. In this manner, the transceiving performance of an antenna can be enhanced, at the same time, multiple types of communication nodes are adapted, and the versatility is improved. The operating environment of the above transmission method provided in the embodiments of the present application is not limited to the above network architecture.

The uplink transmission mentioned in the present application may include at least one of a PUSCH transmission, a physical uplink control channel (PUCCH) transmission, or an SRS transmission. The following embodiments of the present application are all described by using the PUSCH transmission as an example.

The transmission method and device provided by the present application and the effects thereof are described below.

FIG. 1 is a flowchart of a transmission method according to an embodiment. As shown in FIG. 1, the method provided by the embodiment is applicable to a sending terminal, and the sending terminal may be a first communication node (such as a terminal or a UE). The method includes steps described below.

In step S110, a transmission mode of a first communication node is determined.

In an embodiment, the method for determining the transmission mode of the first communication node may include any one of the two methods described below.

Method one: the first communication node reports a capability of the first communication node to a second communication node (such as a base station, a network side, or a nodeB), and determines the transmission mode of the first communication node by the first communication node itself.

Method two: the first communication node reports the capability of the first communication node to the second communication node, and the second communication node configures the transmission mode for the first communication node according to the capability of the first communication node, and sends the transmission mode to the first communication node.

The transmission mode includes at least one of a first mode or a second mode.

In an embodiment, when the transmission mode is the first mode, the first communication node has at least one of the features described below.

The first communication node sends one layer of a transmission on more than X ports. X is determined by the coherent capability of the first communication node. When the transmission coherent characteristic of the first communication node is non-coherent (for example, pusch-TransCoherence parameter is nonCoherent), X=1; and/or, when the transmission coherent characteristic of the first communication node is partially coherent (for example, pusch-TransCoherence parameter is partialCoherent), X=2.

The first communication node sends the one layer of the transmission by using at least two ports without coherence. When the first communication node sends the one layer of the transmission by using the at least two ports without coherence, a phase difference between the at least two ports is random; alternatively, when a TPMI exceeding the coherent capability of the first communication node is used, the first communication node is allowed to change a phase of an antenna port.

All SRS resources in an SRS resource set support the same number of SRS ports, and the SRS resource set with the usage of codebook is configured for the first communication node in the first mode.

In an embodiment, when the transmission mode is the second mode, the first communication node has at least one of the features described below.

When the first communication node supports sending the transmission on ports whose number is less than a configured number of ports, or when an all-0 row exists in a precoding matrix corresponding to a TPMI used by the transmission, or when a zero-power port exists in a precoding matrix corresponding to the TPMI used by the transmission, power of each port is determined by a power capability of the first communication node; the number of different numbers among the numbers of SRS ports supported by different SRS resources in an SRS resource set is greater than or equal to 1, and the SRS resource set with the usage of codebook is configured for the first communication node in the second mode.

The number of different numbers among the numbers of SRS ports supported by different SRS resources in the SRS resource set being greater than or equal to 1 refers to that different SRS resources in the SRS resource set may be configured with different numbers of SRS ports. For example, the SRS resource set contains 3 SRS resources, and the numbers of ports of these 3 SRS resources are 4, 2, and 1, respectively, the number of different numbers among the numbers of SRS ports is 3; and if the SRS resource set contains 4 SRS resources, and the numbers of ports of the 4 SRS resources are 4, 1, 4, and 1, respectively, the number of different numbers among the numbers of SRS ports is 2.

In step S120, at least one of a codebook or a transmission power ratio is determined according to the transmission mode.

In an embodiment, when the transmission mode is the first mode, the step in which the codebook is determined according to the transmission mode may include a step described below.

The first communication node whose codebookSubset parameter is partialAndNonCoherent or nonCoherent supports the codebook including an extended TPMI set or supports a full power state.

The transmission supporting the full power state has at least one of the features described below.

The number of layers is 1.

A TPMI is a reserved value.

The transmission is sent by occupying all ports configured for an SRS resource related to the transmission. The SRS resource related to the transmission refers to an SRS resource corresponding to an SRS resource indicator (SRI) contained in control information (DCI) scheduling the transmission. Each SRS resource is configured with the number of SRS ports for MIMO channel sounding. Sending the transmission by occupying all ports configured for the SRS resource related to the transmission refers to that the power of each of all ports configured for the SRS resource related to the transmission is not 0.

The transmission having the same power on all non-zero-power ports refers to that the first communication node uses all ports configured for the SRS resource related to the transmission to send the transmission, and each port has the same power.

The precoding of the transmission has the same modulus value on all non-zero-power ports.

Phases of the precoding of the transmission on all non-zero-power ports depend on the first communication node.

The precoding of the transmission depends on the first communication node.

In an embodiment, the full power state is indicated in one of a full power state indication field in control information scheduling the transmission or a field of precoding information and number of layers.

The full power state indicated in the full power state indication field in the control information scheduling the transmission refers to that one field in the control information (DCI) for scheduling the transmission is used to indicate whether the full power state is open or closed. For example, the value of 1 represents open, and the value of 0 represents closed. The full power state indicated in the field of precoding information and number of layers in the control information scheduling the transmission refers to that a state (a state in a relationship table between values of fields corresponding to the field of precoding information and number of layers and the precoding information and the number of layers, which may also be referred to as a code point or an entry) exists in the field of precoding information and number of layers in the control information (DCI) for scheduling the transmission. For example, the number of layers and the precoding information that the value for the field of precoding information and number of layers includes 0 to 11 and the codebookSubset parameter is nonCoherent are shown in Table 2. Values of 12 to 15 are reserved. In the present implementation, the value of 12 represents the full power state. When the field of precoding information and number of layers indicated in the control information (DCI) has the value of 12 in the case where the codebookSubset parameter is nonCoherent, it represents that the full power state is open.

In an embodiment, the extended TPMI set has at least one of the features described below.

The extended TPMI set is a universal set of a TPMI set whose codebookSubset parameter is fullyAndPartialAndNonCoherent; the extended TPMI set is a subset of a TPMI set whose codebookSubset parameter is fullyAndPartialAndNonCoherent; or a random phase difference exits between ports of a precoding matrix of the extended TPMI set.

In an embodiment, in response to the number of antenna ports being 4, for the first communication node whose codebookSubset parameter is nonCoherent, the field of precoding information and number of layers of the first communication node includes at least one of the cases described below.

1 layer: TPMI=4; 1 layer: TPMI=8; 1 layer: TPMI=12; 2 layers: TPMI=6; 2 layers: TPMI=14; 3 layers: TPMI=1; 3 layers: TPMI=3; 4 layers: TPMI=1; or 4 layers: TPMI=3.

In response to the number of antenna ports being 4, for the first communication node whose codebookSubset parameter is partialAndNonCoherent, the field of precoding information and number of layers of the first communication node includes at least one of the cases described below.

1 layer: TPMI=12; 2 layers: TPMI=14; 3 layers: TPMI=3; or 4 layers: TPMI=3.

In response to the number of antenna ports being 2, for the first communication node whose codebookSubset parameter is nonCoherent, the field of precoding information and number of layers of the first communication node includes at least one of the cases described below.

1 layer: TPMI=2; or 2 layers: TPMI=1.

In an embodiment, the extended TPMI set includes at least one of the precoding matrices described below.

$$\frac{1}{\sqrt{2}}\begin{bmatrix}1\\\alpha\end{bmatrix}, \frac{1}{2}\begin{bmatrix}1\\0\\\alpha\\0\end{bmatrix}, \frac{1}{2}\begin{bmatrix}0\\1\\0\\\alpha\end{bmatrix}, \frac{1}{2}\begin{bmatrix}1\\\alpha\\\beta\\\gamma\end{bmatrix}, \frac{1}{2}\begin{bmatrix}1\\\alpha\\1\\\alpha\end{bmatrix}, \frac{1}{2}\begin{bmatrix}1\\\alpha\\j\\j\alpha\end{bmatrix}, \frac{1}{2}\begin{bmatrix}1\\\alpha\\-1\\-\alpha\end{bmatrix},$$

$$\frac{1}{2}\begin{bmatrix}1\\\alpha\\-j\\-j\alpha\end{bmatrix}, \frac{1}{2}\begin{bmatrix}1\\\alpha\\1\\-\alpha\end{bmatrix}, \frac{1}{2}\begin{bmatrix}1\\j\alpha\\j\\\alpha\end{bmatrix}, \frac{1}{2}\begin{bmatrix}1\\\alpha\\-1\\\alpha\end{bmatrix}, \frac{1}{2}\begin{bmatrix}1\\\alpha\\-j\\j\alpha\end{bmatrix}, \frac{1}{2}\begin{bmatrix}1&0\\0&1\\\alpha&0\\0&\beta\end{bmatrix}, \text{or } \frac{1}{2}\begin{bmatrix}1&0&0\\0&1&0\\\alpha&0&0\\0&0&1\end{bmatrix}.$$

α, β and γ are all constant modulus complex numbers.

α, β and γ are the constant modulus complex numbers and may be complex numbers having the modulus of 1. α, β and γ may also be written in the exponential form, for example, $\alpha=e^{jx}$. Phases of α, β and γ are not fixed, and non-fixed phases may also satisfy a predetermined value range. For example, the value range of α includes, but is not limited to, −A to +B, and A and B are values representing phases. For example, π, π/2, π/4 and the like.

Values of the constant modulus complex numbers α, β, γ are determined by at least one of the following parameters: a serial number of a frequency domain unit, a serial number of a time domain unit, or a serial number of a modulated and coded symbol. Alternatively, values of α, β, γ are related to at least one of the following parameters: the serial number of the frequency domain unit, the serial number of the time domain unit, or the serial number of the modulated and coded symbol. Alternatively, values of α, β, γ may be the same or different for at least one of the following parameters: the serial number of the frequency domain unit, the serial number of the time domain unit, or the serial number of the modulated and coded symbol. Alternatively, values of α, β, γ are independent for different ones of at least one of the following parameters: the serial number of the frequency domain unit, the serial number of the time domain unit, or the serial number of the modulated and coded symbol.

The frequency domain unit includes one of a resource block (RB), a resource element (RE), a bandwidth part (BWP), or a component carrier (CC). The serial number of the frequency domain unit refers to a serial number of the above frequency domain unit, for example, RB #1 or RB #2.

The time domain unit includes one of an orthogonal frequency division multiplexing (OFDM) symbol, a slot, a subframe, or a radio frame. The serial number of the time domain unit refers to a serial number of the above time domain unit, for example, slot #1 or slot #2.

The modulated and coded symbol refers to a symbol of a complex number field after modulation and coding of source bit data. The modulated and coded symbol is mapped to the MIMO layer, and the modulated and coded symbol may also be referred to as a modulated and coded symbol on the MIMO layer. The serial number of the modulated and coded symbol refers to a serial number of the modulated and coded symbol, or a serial number of the modulated and coded symbol on the MIMO layer. For example, the number of modulated and coded symbols after the modulation and coding is 4, serial numbers of the modulated and coded symbols are #1 to #4. The number of MIMO layers is 2, the number of modulation mode symbols on each MIMO layer is 2, and serial numbers of the modulation mode symbols on each layer are #1 to #2.

In an embodiment, the step in which the transmission power ratio is determined according to the transmission mode includes at least one of the methods described below.

When the transmission mode is the second mode, the transmission power ratio is determined according to a power capability of a TPMI of the transmission; when the transmission mode is the first mode, the transmission power ratio is determined according to the number of ports of an SRS resource corresponding to the transmission; when the transmission mode is the first mode, the transmission power ratio is determined according to the maximum number of ports of all SRS resources in an SRS resource set corresponding to the transmission.

Determination of the transmission power ratio according to the power capability of the TPMI of the transmission includes at least one of the methods described below.

A power capability of a universal set or a subset of TPMIs having precoding matrices with zero-ports is sent to the second communication node, where the TPMIs are in a TPMI set supported by the first communication node; power capabilities of universal sets or subsets of TPMIs having precoding matrices with zero-ports are sent to the second communication node, where the TPMIs are in the TPMI set supported by the first communication node and the power capabilities respectively correspond to different numbers of ports; a power capability supported by each port respectively corresponding to each different number of ports is sent to the second communication node; at least one power capability of a power capability set supported by a predefined TPMI is sent to the second communication node; at least one power capability of a power capability set supported by a predefined port is sent to the second communication node; at least one power capability of a power capability set supported by a predefined TPMI and respectively corresponding to each different number of ports is sent to the second communication node; or at least one power capability of a power capability set supported by a predefined port and respectively corresponding to each different number of ports is sent to the second communication node.

The different numbers of ports refer to one of different numbers of ports supported by the first communication node or different numbers of ports configured for the first communication node. The former is determined by the capability of the first communication node, and the latter is determined by configuration information of the second communication node. For example, the UE supports 4 ports, 2 ports, and 1 port. The base station configures an SRS resource set for the UE, the SRS resource set includes 2 SRS resources respectively configured with 2 ports and 1 port. The UE sends power capabilities of universal sets or subsets of TPMIs having precoding matrices with zero-ports to the second communication node respectively in the cases of the numbers of ports being 4, 2 and 1, and the TPMIs are in a TPMI set supported by the first communication node and the power capabilities respectively correspond to the numbers of ports; alternatively, the UE may send a power capability supported by each port corresponding to each number of ports to the second communication node respectively in the cases of the numbers of ports being 4, 2 and 1; alternatively, the UE may send power capabilities of universal sets or subsets of TPMIs having precoding matrices with zero-ports to the second communication node respectively in the cases of the numbers of ports being 2 and 1, and the TPMIs are in the TPMI set supported by the first communication node and the power capabilities respectively correspond to the numbers of ports; alternatively, the UE may send a power capability supported by each port corresponding to each number of ports to the second communication node respectively in the cases of the numbers of ports being 2 and 1.

Different numbers of ports refer to the case where the number of ports is greater than 1. If the number of ports equal to 1, it is not required that the UE reports the supported power capability, and the full-power transmission is supported by default.

In an embodiment, the power capability set supported by the predefined TPMI includes at least one of the power capabilities described below.

A power capability supported by TPMI 0 of 1 layer and 4 antenna ports; a power capability supported by TPMI 1 of 1 layer and 4 antenna ports; a power capability supported by TPMI 2 of 1 layer and 4 antenna ports; a power capability supported by TPMI 3 of 1 layer and 4 antenna ports; a full power capability supported by TPMI 0 of 1 layer and 4 antenna ports; a full power capability supported by both TPMI 0 and TPMI 1 of 1 layer and 4 antenna ports; a full power capability supported by both TPMI 0 and TPMI 2 of 1 layer and 4 antenna ports; a full power capability supported by all TPMI 0 to TPMI 3 of 1 layer and 4 antenna ports; a power capability supported by TPMI 0 of 1 layer and 2 antenna ports; a power capability supported by TPMI 1 of 1 layer and 2 antenna ports; a full power capability supported by TPMI 0 of 1 layer and 2 antenna ports; or a full power capability supported by both TPMI 0 and TPMI 1 of 1 layer and 2 antenna ports.

The TPMI supporting the full power refers to that when a transmission uses the precoding matrix of the TPMI, the maximum power of the transmission may reach the maximum power of the first communication node.

For example, for 4 ports, the power capability set supported by the predefined TPMI includes the power capabilities described below:

the power capability supported by TPMI 0 of 1 layer and 4 antenna ports; the power capability supported by TPMI 1 of 1 layer and 4 antenna ports; the power capability supported by TPMI 2 of 1 layer and 4 antenna ports; and the power capability supported by TPMI 3 of 1 layer and 4 antenna ports.

The UE separately reports the above power capabilities to the base station. The reported overhead is 4*N1, where N1 is a power capability overhead. When the power capability is whether to support the full power, N1 is 1 bit. When the power capability is the supported power class, and the power class is 1, ½ or ¼, the power capability overhead N1 is 2 bits.

For 4 ports, the power capability set supported by the predefined TPMI may further include the power capabilities described below:

the full power capability supported by TPMI 0 of 1 layer and 4 antenna ports; the full power capability supported by both TPMI 0 and TPMI 1 of 1 layer and 4 antenna ports; the full power capability supported by both TPMI 0 and TPMI 2 of 1 layer and 4 antenna ports; and the full power capability supported by all TPMI 0 to TPMI 3 of 1 layer and 4 antenna ports.

The UE reports one of the above power capabilities to the base station. The reported overhead is 2 bits. A 2-bit value of 00, 01, 10, or 11 respectively represents one of the above four cases.

For 2 ports, the power capability set supported by the predefined TPMI includes the power capabilities described below:

the power capability supported by TPMI 0 of 1 layer and 2 antenna ports; and the power capability supported by TPMI 1 of 1 layer and 2 antenna ports.

The UE separately reports the above power capabilities to the base station. The reported overhead is 2*N1, where N1 is the power capability overhead. When the power capability is whether to support the full power, N1 is 1 bit. When the power capability is the supported power class, and the power class is 1, ½, or ¼, the power capability overhead N1 is 2 bits.

For 2 ports, the power capability set supported by the predefined TPMI may further include the power capabilities described below:

the full power capability supported by TPMI 0 of 1 layer and 2 antenna ports; and the full power capability supported by both TPMI 0 and TPMI 1 of 1 layer and 2 antenna ports.

The UE reports one of the above power capabilities to the base station. The reported overhead occupies 1 bit. A 1-bit value of 0 or 1 respectively represents one of the above two cases.

In an embodiment, the power capability set supported by the predefined port includes at least one of the power capabilities described below.

a power capability supported by port 0 of 4 antenna ports; a power capability supported by port 1 of 4 antenna ports; a power capability supported by port 2 of 4 antenna ports; a power capability supported by port 3 of 4 antenna ports; a full power capability supported by port 0 of 4 antenna ports; a full power capability supported by both port 0 and port 1 of 4 antenna ports; a full power capability supported by both port 0 and port 2 of 4 antenna ports; a full power capability supported by all port 0 to port 3 of 4 antenna ports; a power capability supported by port 0 of 2 antenna ports; a power capability supported by port 1 of 2 antenna ports; a full power capability supported by port 0 of 2 antenna ports; or a full power capability supported by both port 0 and port 1 of 2 antenna ports.

For example, for 4 ports, the power capability set supported by the predefined port includes the power capabilities described below:

the power capability supported by port 0 of 4 antenna ports; the power capability supported by port 1 of 4 antenna ports; the power capability supported by port 2 of 4 antenna ports; and the power capability supported by port 3 of 4 antenna ports.

The UE separately reports the above power capabilities to the base station. The reported overhead is 4*N2, where N2 is the power capability overhead. When the power capability is whether to support the full power, N2 is 1 bit. When the power capability is the supported power class, and the power class is 1, ½ or ¼, the power capability overhead N2 is 2 bits.

For 4 ports, the power capability set supported by the predefined port may further include the power capabilities described below:

the full power capability supported by port 0 of 4 antenna ports; the full power capability supported by both port 0 and port 1 of 4 antenna ports; the full power capability supported by both port 0 and port 2 of 4 antenna ports; and the full power capability supported by all port 0 to port 3 of 4 antenna ports. The UE reports one of the above power capabilities to the base station. The reported overhead is 2 bits. A 2-bit value of 00, 01, 10, or 11 respectively represents one of the above four cases.

For 2 ports, the power capability set supported by the predefined port includes the power capabilities described below:

the power capability supported by port 0 of 2 antenna ports; and the power capability supported by port 1 of 2 antenna ports. The UE separately reports the above power capabilities to the base station. The reported overhead is 2*N2, where N2 is power capability overhead. When the power capability is whether to support the full power, N2 is 1 bit. When the power capability is the supported power class, and the power class is 1, ½, or ¼, the power capability overhead N2 is 2 bits.

For 2 ports, the power capability set supported by the predefined TPMI may further include the power capabilities described below:

the full power capability supported by port 0 of 2 antenna ports; and the full power capability supported by both port 0 and port 1 of 2 antenna ports.

The UE reports one of the above power capabilities to the base station. The reported overhead is 1 bit. A 1-bit value of 0 or 1 respectively represents one of the above two cases.

In an embodiment, the first communication node has at least one of the features described below.

In response to TPMI 0 of 1 layer and 4 antenna ports supporting the full power capability or port 0 of 4 antenna ports supporting the full power capability, all TPMIs in a 4-antenna TPMI set which are supported by the first communication node and have precoding matrices with non-zero port 0 support the full power capability; in response to TPMI 1 of 1 layer and 4 antenna ports supporting the full power capability or port 1 of 4 antenna ports supporting the full power capability, all TPMIs in a 4-antenna TPMI set which are supported by the first communication node and have precoding matrices with non-zero port 1 support the full power capability; in response to TPMI 2 of 1 layer and 4 antenna ports supporting the full power capability or port 2 of 4 antenna ports supporting the full power capability, all TPMIs in a 4-antenna TPMI set which are supported by the first communication node and have precoding matrices with non-zero port 2 support the full power capability; in response to TPMI 3 of 1 layer and 4 antenna ports supporting the full power capability or port 3 of 4 antenna ports supporting the full power capability, all TPMIs in a 4-antenna TPMI set which are supported by the first communication node and have precoding matrices with non-zero port 3 support the full power capability; in response to TPMI 0 of 1 layer and 2 antenna ports supporting the full power capability or port 0 of 2 antenna ports supporting the full power capability, all TPMIs in a 2-antenna TPMI set which are supported by the first communication node and have precoding matrices with non-zero port 0 support the full power capability; or in response to TPMI 1 of 1 layer and 2 antenna ports supporting the full power capability or port 1 of 2 antenna ports supporting the full power capability, all TPMIs in a 2-antenna TPMI set which are supported by the first communication node and have precoding matrices with non-zero port 1 support the full power capability; where a power capability of a TPMI supported by the first communication node is a smaller value between a sum of power supported by all non-zero ports of the TPMI and the maximum transmission power of the first communication node; and in response to the number of non-zero ports of the TPMI supported by the first communication node being zero, the TPMI supports the full power capability.

In an embodiment, the power capability includes at least one of the items described below.

Whether to reach the maximum transmission power of the first communication node; or a power class; where the power class is a ratio of the power capability to the maximum transmission power of the first communication node.

The TPMI or the port supporting the full power refers to that when a transmission uses the TPMI or only the precoding matrix of the port, the maximum power of the transmission may reach the maximum transmission power of the first communication node, such as Pcmax.

In step S130, the transmission is sent according to the at least one of the codebook or the transmission power ratio.

In an embodiment, for the first communication node, the transmission has at least one of the features described below.

The number of open-loop power control parameters of the transmission does not exceed a predefined value X12; the number of closed-loop power control parameters of the transmission does not exceed a predefined value X13; or the number of path loss measurement parameters of the transmission does not exceed a predefined value X14.

Values of X12, X13 and X14 depend on the capability of the first communication node, or are predefined.

The second communication node configures a power control parameter respectively for different types of transmissions of the first communication node. The power control parameter includes at least one of an open-loop power control parameter, a closed-loop power control parameter, or a path loss measurement parameter.

In an embodiment, the power control parameter includes at least one of the items described below.

1. The open-loop power control parameter. In an embodiment, the open-loop power control parameter may be composed of a path loss adjustment coefficient alpha and/or a target power p0. The magnitude of the power may be changed by changing the magnitude of the alpha.

2. A reference signal parameter of a path loss (PL). A reference signal resource index is included, and the path loss is obtained from the reference signal measurement result identified by the reference signal index.

3. A closed-loop power control parameter. The closed-loop power control parameter includes at least one of a closed-loop power control index or a closed-loop power control amount.

For example, the second communication node (such as a base station) configures for a PUSCH transmission of the first communication node (such as a UE) the open-loop power control parameter, the closed-loop power control parameter and the path loss measurement parameter used for the PUSCH transmission. The second communication node further configures for a PUCCH transmission of the first communication node the open-loop power control parameter, the closed-loop power control parameter and the path loss measurement parameter used for the PUCCH transmission.

For each type of transmission, there may be multiple supported parameters of each type of power control parameter. For example, the number of open-loop power control parameters for the PUSCH transmission may be at most 32, the number of closed-loop power control parameters for the PUSCH transmission may be at most 2. The number of path loss measurement parameters for the PUSCH transmission may be at most 4.

Figure 2:
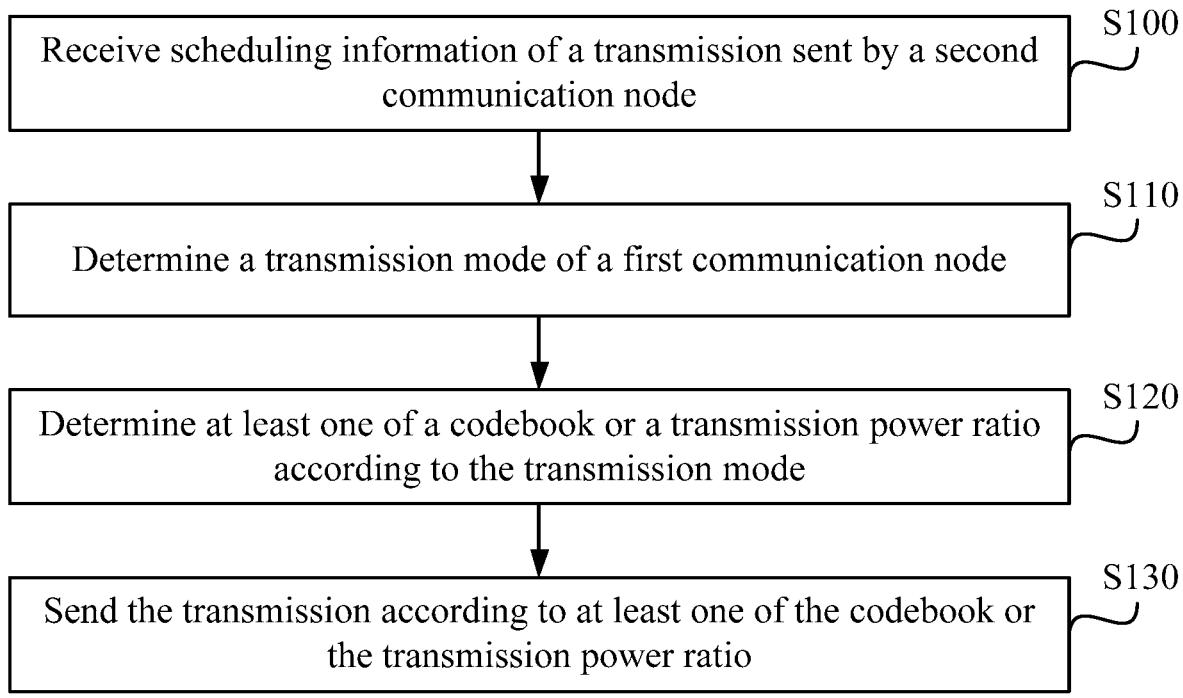
FIG. 2 is a flowchart of another transmission method according to an embodiment.

On the basis of the above embodiment, in conjunction with FIG. 1, FIG. 2 is a flowchart of another transmission method according to an embodiment. In addition to the above steps S110, S120, and S130, the method further includes a step described below.

In step S100, scheduling information of the transmission sent by a second communication node is received.

The scheduling information of the transmission includes at least one of the following information: frequency domain resource allocation information, time domain resource allocation information, a modulation and coding scheme (MCS), or MIMO-related information. The MIMO-related information includes precoding information, the number of layers, an antenna port indicator, etc.

The scheduling information of the transmission is carried in at least one of the following information: radio resource control (RRC) signaling, a media access control control element (MAC CE), or physical layer signaling. The physical layer signaling includes at least one of a physical downlink control channel (PDCCH) or DCI (such as DCI format 0_1).

In an embodiment, the number M of bits for the field of precoding information and number of layers in the physical layer signaling is determined by at least one of the items described below:

the maximum number of ports of an SRS resource in an SRS resource set corresponding to one of the transmission or the first communication node; the number of ports of an SRS resource corresponding to the transmission; the maximum rank or the maximum number of layers; the number of bits configured by the second communication node and for the field of precoding information and number of layers; or a predefined number of bits for the field of precoding information and number of layers.

In an embodiment, the precoding information and the number of layers indicated by a value of the field of precoding information and number of layers in the physical layer signaling are analyzed by at least one of the information described below:

the number of the ports of the SRS resource corresponding to the transmission; the maximum rank or the maximum number of layers of the first communication node; or the actual maximum rank or the actual maximum number of layers.

The precoding information and the number of layers indicated by the value of the field of precoding information and number of layers in the physical layer signaling are analyzed by the number of the ports of the SRS resource corresponding to the transmission and the maximum rank or the maximum number of layers of the first communication node.

When the maximum rank or the maximum number of layers of the first communication node is greater than the number of the ports of the SRS resource corresponding to the transmission, the precoding information and the number of layers indicated by the value of the field of precoding information and number of layers in the physical layer signaling are analyzed by the actual maximum rank or the actual maximum number of layers, and the number of ports of the SRS resource corresponding to the transmission. The actual maximum rank or the actual maximum number of layers is less than or equal to the number of the ports of the SRS resource corresponding to the transmission. In an implementation manner, the actual maximum rank or the actual maximum number of layers is equal to the number of the ports of the SRS resource corresponding to the transmission.

Exemplarily, the maximum rank or the maximum number of layers of the first communication node is 4, and the number of the ports of the SRS resource corresponding to the transmission is 2. When the precoding information and the number of layers indicated by the value of the field of precoding information and number of layers in the physical layer signaling are analyzed by looking up a table, the table with the number of ports of 2 needs to be looked up, such as Table 4 and Table 5. In these two tables, merely maxRank of 1 or 2 is supported, and maxRank of 4 is not supported. In this case, the actual maximum rank or the actual maximum number of layers, such as 2, may be used to look up the table, so that Table 4 is looked up. Table 4 and Table 5 here are used as an example, there may be tables varied from Table 4 and Table 5 in practical cases.

For the above examples, another adoptable manner is to expand the application scope of Table 4, that is, to enable Table 4 to be applied to the maximum rank of 3 or 4.

In an embodiment, when the number of the ports of the SRS resource corresponding to the transmission is less than the maximum number of the ports of the SRS resource in the SRS resource set, the number of necessary indication bits for the precoding information and the number of layers corresponding to the transmission is N, where N is less than or equal to M.

The M bits for the field of precoding information and number of layers in the physical layer signaling include the N necessary indication bits for the precoding information and the number of layers, and the remaining (M−N) bits are preset values or a repetition of the N necessary indication bits for the precoding information and the number of layers.

The physical layer signaling includes SRS information, and the SRS information is used to indicate an SRS resource in an SRS resource set of the first communication node.

The SRS resource is associated with at least one of a spatial relation, a panel, or a beam. Each SRS resource is configured with a number of SRS ports.

In an embodiment, the SRS resource in the SRS resource set is determined according to one of the features described below.

SRS resources associated with the same spatial relation belong to one SRS group; SRS resources associated with the same panel belong to one SRS group; SRS resources associated with the same beam belong to one SRS group; SRS resources whose associated beams have a quasi co-location (QCL) relationship belong to one SRS group; or SRS resources with the same number of SRS ports belong to one SRS group.

The SRS resource in the SRS resource set has at least one of the features described below.

SRS resources with the same number of ports are associated with different spatial relations; SRS resources with the same number of ports are associated with different panels; SRS resources with the same number of ports are associated with different beams; beams associated with SRS resources having the same number of ports have no QCL relationship; or resources belonging to the same SRS group have different numbers of ports.

For example, one SRS group includes 3 SRS resources, and the number of ports configured for each SRS resource is different. The numbers of ports of these three SRS resources may be 1, 2 and 4.

In an embodiment, for the first communication node, the SRS resource in the SRS resource set has at least one of the features described below.

The number of SRS groups does not exceed a predefined value X1; the number of spatial relations associated with the SRS resource in the SRS resource set does not exceed a predefined value X2; the number of panels associated with the SRS resource in the SRS resource set does not exceed a predefined value X3; the number of different port numbers among numbers of ports associated with the SRS resource in the SRS resource set does not exceed a predefined value X4; the number of SRS resources in the SRS resource set does not exceed a predefined value X5; the number of open-loop power control parameters configured for the SRS resource set does not exceed a predefined value X6; the number of closed-loop power control parameters configured for the SRS resource set does not exceed a predefined value X7; the number of path loss measurement parameters configured for the SRS resource set does not exceed a predefined value X8; the number of open-loop power control parameters configured for all SRS resources in the SRS resource set does not exceed a predefined value X9; the number of closed-loop power control parameters configured for all SRS resources in the SRS resource set does not exceed a predefined value X10; or the number of path loss measurement parameters configured for all SRS resources in the SRS resource set does not exceed a predefined value X11.

Values of X1, X2, X3, X4, X5, X6, X7, X8, X9, X10 and X11 depend on the capability of the first communication node or are predefined values.

In an embodiment, all SRS resources in the SRS resource set are divided into X SRS groups, where X is a positive integer, and SRS resources contained in one of the X SRS groups are determined by SRS resource serial numbers.

SRS resources whose SRS resource serial numbers are even numbers and SRS resources whose SRS resource serial numbers are odd numbers respectively belong to different SRS groups; alternatively, a required number of SRS resources are sequentially allocated for each of the X SRS groups according to an SRS resource serial number order; alternatively, SRS resources are allocated in turn for each of the X SRS groups according to the SRS resource serial number order until allocation is completed.

It is assumed that the SRS resource set includes 4 SRS resources, and the SRS resource serial numbers are 0, 1, 2, and 3, respectively, so the number X of SRS groups corresponding to the 4 SRS resources is equal to 2. The SRS grouping manner may be one of the manners described below.

SRS resources whose SRS resource serial numbers are even numbers and SRS resources whose SRS resource serial numbers are odd numbers respectively belong to different SRS groups. That is, SRS resources having SRS resource serial numbers of 0 and 2 belong to SRS group 0, and SRS resources having SRS resource serial numbers of 1 and 3 belong to SRS group 1.

The required number of SRS resources are sequentially allocated for each of the X SRS groups according to the SRS resource serial number order. It is assumed that the number of SRS resources in SRS group 0 and the number of SRS resources in SRS group 1 are the same and both 2, so that SRS resources having SRS resource serial numbers of 0 and 1 belong to the SRS group 0, while SRS resources having SRS resource serial numbers of 2 and 3 belong to the SRS group 1. The number of SRS resources in SRS group 0 and the number of SRS resources in SRS group 1 may also be different. It is assumed that the number of SRS resources in SRS group 0 is 1, the number of SRS resources in SRS group 1 is 3, so an SRS resource having an SRS resource serial number of 0 belongs to SRS group 0, and SRS resources having SRS resource numbers of 1, 2, and 3 belong to SRS group 1. The number of SRS resources in the SRS group (also referred to as the number of SRS resources required by the SRS group) is configured or indicated by the second communication node, or determined by predefined information.

SRS resources are allocated in turn for each of the X SRS groups according to the SRS resource serial number order until allocation is completed. That is, the SRS resource having the SRS resource serial number of 0 is allocated to SRS group 0, the SRS resource having the SRS resource serial number of 1 is allocated to SRS group 1, the SRS resource having the SRS resource serial number of 2 is allocated to SRS group 0, and the SRS resource having the SRS resource serial number of 3 is allocated to SRS group 1.

In an embodiment, the SRS information includes first SRS information and second SRS information, the first SRS information is used to indicate an SRS group, and the second SRS information is used to indicate an SRS resource serial number within an SRS group.

The second SRS information includes at least one of the features described below.

The second SRS information is indicated jointly with precoding information and the number of layers. That the second SRS information is indicated jointly with the precoding information and the number of layers refers to that a field of synthetic information is used to indicate information about the second SRS information, the precoding information and the number of layers. Each value of the field of the synthetic information contains a value of the second SRS information and a value of the precoding information and the number of layers.

A field of precoding information and number of layers includes the second SRS information.

Different second SRS information corresponds to different precoding information and different numbers of layers.

For example, when the second SRS information has the value of 1, the number of values of the precoding information and the number of layers is 4, and when the second SRS information has the value of 2, the number of values of the precoding information and the number of layers is 1.

The second SRS information includes the number of SRS ports.

In the embodiments of the present application, the transmission mode of the first communication node is determined, at least one of the codebook or the transmission power ratio is determined according to the transmission mode, and the first communication node sends the transmission according to the at least one of the codebook or the transmission power ratio. In this manner, the transceiving performance of an antenna can be enhanced, at the same time, multiple types of communication nodes are adapted, and the versatility is improved.

Figure 3:
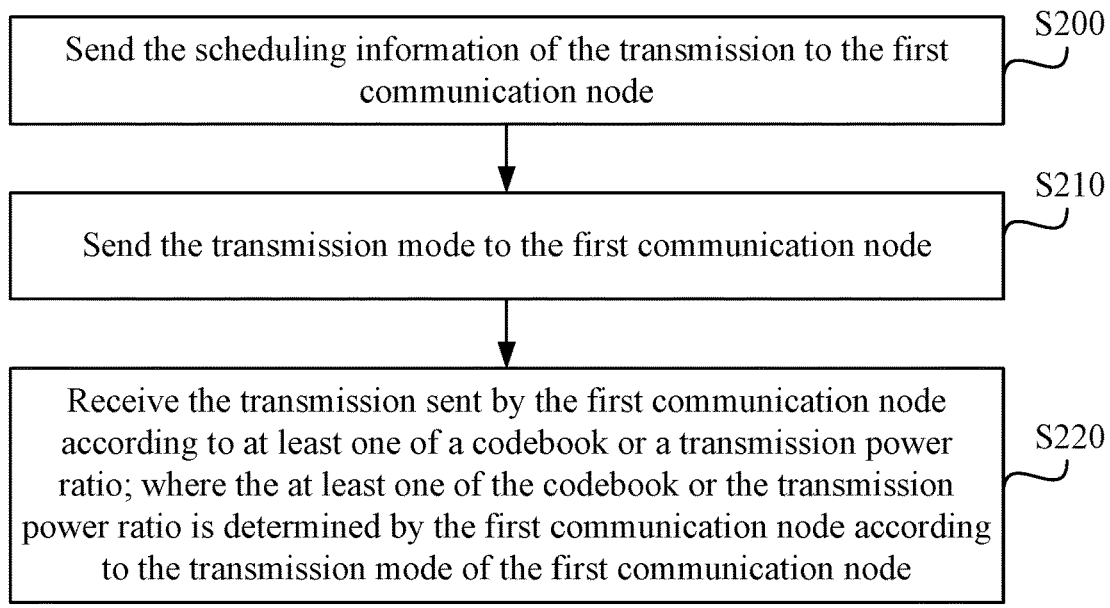
FIG. 3 is a flowchart of another transmission method according to an embodiment.

FIG. 3 is a flowchart of another transmission method according to an embodiment. As shown in FIG. 3, the method provided by the embodiment is applicable to a receiving terminal, and the receiving terminal may be a second communication node (such as a network side device). The method includes steps described below.

In step S200, scheduling information of a transmission is sent to the first communication node.

The scheduling information of the transmission is carried in at least one of the following information: RRC signaling, a MAC CE, or physical layer signaling, where the physical layer signaling includes at least one of a PDCCH or DCI (such as DCI format 0_1).

In an embodiment, the number M of bits for a field of precoding information and number of layers in the physical layer signaling is determined by at least one of the items described below:

the maximum number of ports of an SRS resource in an SRS resource set corresponding to one of the transmission or the first communication node; the number of ports of an SRS resource corresponding to the transmission; the maximum rank or the maximum number of layers; the number of bits configured by the second communication node and for the field of precoding information and number of layers; or a predefined number of bits for the field of precoding information and number of layers.

In an embodiment, the precoding information and the number of layers indicated by a value of the field of precoding information and number of layers in the physical layer signaling are analyzed by at least one of the information described below:

the number of the ports of the SRS resource corresponding to the transmission; the maximum rank or the maximum number of layers of the first communication node; or the actual maximum rank or the actual maximum number of layers.

In an embodiment, when the number of the ports of the SRS resource corresponding to the transmission is less than the maximum number of the ports of the SRS resource in the SRS resource set, the number of necessary indication bits for the precoding information and the number of layers corresponding to the transmission is N, where N is less than or equal to M.

The M bits for the field of precoding information and number of layers in the physical layer signaling include the N necessary indication bits for the precoding information and the number of layers, and the remaining (M–N) bits are preset values or a repetition of the N necessary indication bits for the precoding information and the number of layers.

The physical layer signaling includes SRS information, and the SRS information is used to indicate an SRS resource in an SRS resource set of the first communication node.

The SRS resource is associated with at least one of a spatial relation, a panel, or a beam. Each SRS resource is configured with a number of SRS ports.

In an embodiment, the SRS resource in the SRS resource set is determined according to one of the features described below.

SRS resources associated with the same spatial relation belong to one SRS group; SRS resources associated with the same panel belong to one SRS group; SRS resources associated with the same beam belong to one SRS group; SRS resources whose associated beams have a QCL relationship belong to one SRS group; or SRS resources with the same number of SRS ports belong to one SRS group.

The SRS resource in the SRS resource set has at least one of the features described below.

SRS resources with the same number of ports are associated with different spatial relations; SRS resources with the same number of ports are associated with different panels; SRS resources with the same number of ports are associated with different beams; beams associated with SRS resources having the same number of ports have no QCL relationship; or resources belonging to the same SRS group have different numbers of ports.

For example, one SRS group includes 3 SRS resources, and the number of ports configured for each SRS resource is different. The numbers of ports of these 3 SRS resources may be 1, 2, and 4.

In an embodiment, all SRS resources in the SRS resource set are divided into X SRS groups, where X is a positive integer, and SRS resources contained in one of the X SRS groups are determined by SRS resource serial numbers.

SRS resources whose SRS resource serial numbers are even numbers and SRS resources whose SRS resource serial numbers are odd numbers respectively belong to different SRS groups; alternatively, a required number of SRS resources are sequentially allocated for each of the X SRS groups according to an SRS resource serial number order; alternatively, SRS resources are allocated in turn for each of the X SRS groups according to the SRS resource serial number order until allocation is completed.

In an embodiment, the SRS information includes first SRS information and second SRS information, the first SRS information is used to indicate an SRS group, and the second SRS information is used to indicate an SRS resource serial number within an SRS group.

The second SRS information includes at least one of the features described below.

The second SRS information is indicated jointly with precoding information and the number of layers. That the second SRS information is indicated jointly with the precoding information and the number of layers refers to that a field of synthetic information is used to indicate information about the second SRS information, the precoding information and the number of layers. Each value of the field of the synthetic information contains a value of the second SRS information and a value of the precoding information and the number of layers.

A field of precoding information and number of layers includes the second SRS information.

Different second SRS information corresponds to different precoding information and different numbers of layers.

For example, when the second SRS information has the value of 1, the number of values of the precoding information and the number of layers is 4, and when the second SRS information has the value of 2, the number of values of the precoding information and the number of layers is 1.

The second SRS information includes the number of SRS ports.

In step S210, the transmission mode is sent to the first communication node.

The first communication node reports the capability of the first communication node to the second communication node, and the second communication node configures the transmission mode for the first communication node according to the capability of the first communication node, and sends the transmission mode to the first communication node.

Step S210 is an optional step. If the first communication node determines the transmission mode of the first communication node by itself after reporting the capability of the first communication node to the second communication node, it is not necessary to execute step S210.

The transmission mode includes at least one of a first mode and a second mode.

In step S220, the transmission sent by the first communication node according to at least one of a codebook or a transmission power ratio is received; where the at least one of the codebook or the transmission power ratio is determined by the first communication node according to the transmission mode of the first communication node.

In the embodiment of the present application, the second communication node may receive the transmission sent by the first communication node according to at least one of the codebook or the transmission power ratio, and the at least one of the codebook or the transmission power ratio is determined by the first communication node according to the transmission mode of the first communication node. In this manner, the transceiving performance of an antenna can be enhanced, at the same time, multiple types of communication nodes are adapted, and the versatility is improved.

Some example implementations are listed below to illustrate the transmission method provided by the embodiments of the present application.

In a first example implementation, to support the codebook based PUSCH full-power transmission, the parameter configured by the RRC for the SRS resource set may support multiple SRS resources configured with different numbers of ports. The UE needs to obtain the value of the SRI in the DCI, so that the size of the field of precoding information and number of layers may be determined according to the number of ports supported by the SRS resource of the SRI. However, the size of the field of precoding information and number of layers may be best obtained according to the RRC information, rather than being determined according to other fields in the same DCI. Therefore, the size of the field of precoding information and number of layers is determined by the maximum number of ports among the numbers of ports of the SRS resources in the SRS resource set.

When the number of ports of the SRS resource corresponding to the indicated SRI is less than the maximum number of ports, the actual number of bits required by the field of precoding information and number of layers may also be relatively small. At this time, extra bits in the field of precoding information and number of layers other than the actual required number of bits (that is, the necessary indication bits) are the repetition of the actual required number of bits. In this way, the reception robustness is improved.

Alternatively, when the number of ports of the SRS resource corresponding to the indicated SRI is less than the maximum number of ports, the actual number of bits required by the field of precoding information and number of layers may also be relatively small. At this time, extra bits in the field of precoding information and number of layers other than the actual required number of bits (that is, the necessary indication bits) are set to predefined values, in this manner, the predefined values may be used for the reception check.

For example, the SRS resource set supports 3 SRS resources, which are respectively represented by SRI 0, SRI 1, and SRI 2 in the DCI. The SRS resource of SRI 0 supports 4 ports, the SRS resource of SRI 1 supports 2 ports, and the SRS resource of SRI 2 supports 1 port. Therefore, the size of the field of precoding information and number of layers in the DCI is determined according to the maximum number of ports, that is, 4 ports, among the numbers of ports of the SRS resources in the SRS resource set. It can be seen from Table 2 and Table 3.

Figure 4:
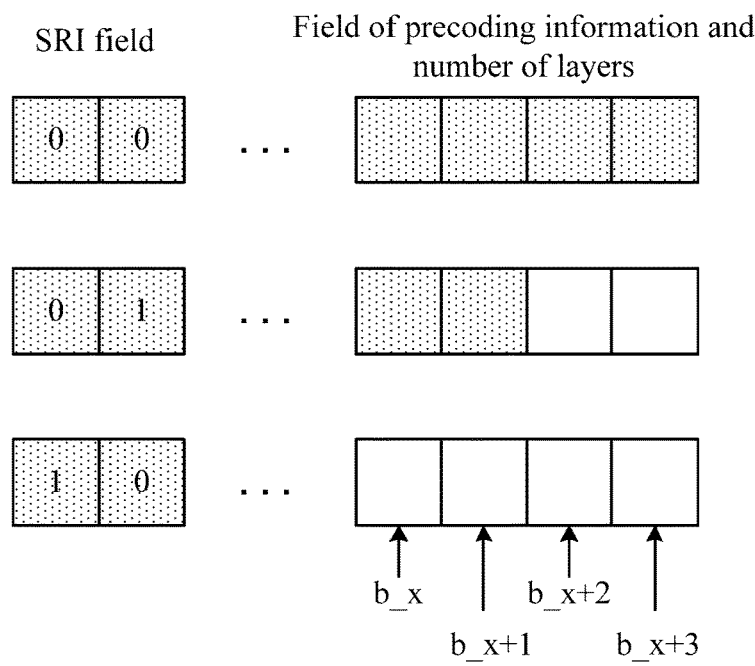
FIG. 4 is a diagram illustrating a correspondence relationship between DCI and a field of precoding information and number of layers according to an embodiment.

It is assumed that the maximum rank of the UE is 2 and the codebookSubset parameter is nonCoherent, the size of the field of precoding information and number of layers is 4 bits. FIG. 4 is a diagram illustrating a correspondence relationship between DCI and a field of precoding information and number of layers according to an embodiment. As shown in FIG. 4, when SRI 0 is indicated in the DCI, the field of precoding information and number of layers has 12 valid indicators, and 4 bits are all valid bits, which are respectively indicated by $b\_x$, $b\_x+1$, $b\_x+2$, and $b\_x+3$. When SRI 1 is indicated in the DCI, the field of precoding information and number of layers has 3 valid indicators, as shown in FIG. 4, so that the size of the field of precoding information and number of layers is 2 bits. That is, bits $b\_x$ and $b\_x+1$ are actual required bits, bits $b\_x+2$ and $b\_x+3$ are extra bits, and $b\_x+2$ and $b\_x+3$ may bear the same content as bits $b\_x$ and $b\_x+1$; alternatively, the extra two bits are set to predefined values, for example, bits $b\_x+2$ and $b\_x+3$ are set to "00". When SRI 2 is indicated in the DCI, since only 1 bit exists, the field of precoding information and number of layers does not need to indicate the TPMI and the number of layers. The actual number of bits required by the field of precoding information and number of layers is 0. At this time, bits $b\_x$, $b\_x+1$, $b\_x+2$, $b\_x+3$ are set to "0000".

In a second example implementation, to support the codebook based PUSCH full-power transmission, the parameter, SRS resource set, configured by the RRC may support multiple SRS resources configured with different numbers of ports. The UE needs to obtain the value of the SRI in the DCI, so that the size of the field of precoding information and number of layers may be determined according to the number of ports supported by the SRS resource of the SRI. However, the size of the field of precoding information and number of layers may be best obtained according to the RRC information, rather than being determined according to other fields in the same DCI. In the first example implementation described above, the size of the field of precoding information and number of layers is determined by the maximum number of ports among the numbers of ports of the SRS resources in the SRS resource set. Another manner is proposed here, in which the SRS information is divided into two parts. The two parts are respectively carried in two fields in the DCI as follows.

The SRS information is divided into two parts. The first part indicates an SRS group, referred to as first SRS information, and the second part is an SRS resource serial number within an SRS group, referred to as second SRS information. The first SRS information is associated with at least one of a spatial relation, a panel, or a beam; and the second SRS information is indicated jointly with the precoding information and the number of layers.

The DCI includes a field for indicating the first SRS information and an information field indicated jointly by the second SRS information, the precoding information and the number of layers.

For example, the SRS resource set supports 6 SRS resources. These 6 SRS resources are divided into 2 groups. The first group includes SRI 0-0, SRI 0-1 and SRI 0-2, and supported numbers of ports are 4, 2, and 1, respectively. The second group includes SRI 1-0, SRI 1-1, and SRI 1-2, and supported numbers of ports are 4, 2, and 1, respectively. Since the SRS resource set includes two groups of SRS resources, the DCI includes the 1-bit field for indicating the first SRS information. 0 represents the first group, and 1 represents the second group.

The second SRS information refers to a serial number of an SRI in the SRI group indicated by the first SRS information, and this information is indicated jointly with the precoding information and the number of layers. The number of antenna ports of the second SRS information is obtained according to the information field indicated jointly by the second SRS information, the precoding information and the number of layers, and the serial number of the SRI in the SRI group is determined according to the number of antenna ports. As shown in Table 12 below, when the first SRS information is 1, and the value of the information field jointly indicated by the second SRS information, the precoding information and the number of layers jointly indicating is 4 antenna ports, which corresponds to SRI 1-0; when the first SRS information is 0, and the value of the information field indicated jointly by the second SRS information, the precoding information and the number of layers is 1 antenna port, which corresponds to SRI 0-2.

TABLE 12

The number of antenna ports, the precoding information and the number of layers of at most 4 antenna ports (transform precoder is disabled and maxrank = 2, 3 or 4)

| Bit field mapped to index | CodebookSubset parameter being fullyAndPartialAndNonCoherent | Bit field mapped to index | CodebookSubset parameter being partialAndNonCoherent | Bit field mapped to index | CodebookSubset parameter being nonCoherent |
|---|---|---|---|---|---|
| 0 | 4 antenna ports 1 layer: TPMI = 0 | 0 | 4 antenna ports 1 layer: TPMI = 0 | 0 | 4 antenna ports 1 layer: TPMI = 0 |
| 1 | 4 antenna ports 1 layer: TPMI = 1 | 1 | 4 antenna ports 1 layer: TPMI = 1 | 1 | 4 antenna ports 1 layer: TPMI = 1 |
| ... | ... | ... | ... | ... | ... |
| 3 | 4 antenna ports 1 layer: TPMI = 3 | 3 | 4 antenna ports 1 layer: TPMI = 3 | 3 | 4 antenna ports 1 layer: TPMI = 3 |
| 4 | 4 antenna ports 2 layers: TPMI = 0 | 4 | 4 antenna ports 2 layers: TPMI = 0 | 4 | 4 antenna ports 2 layers: TPMI = 0 |
| ... | ... | ... | ... | ... | ... |
| 9 | 4 antenna ports 2 layers: TPMI = 5 | 9 | 4 antenna ports 2 layers: TPMI = 5 | 9 | 4 antenna ports 2 layers: TPMI = 5 |
| 10 | 4 antenna ports 3 layers: TPMI = 0 | 10 | 4 antenna ports 3 layers: TPMI = 0 | 10 | 4 antenna ports 3 layers: TPMI = 0 |
| 11 | 4 antenna ports 4 layers: TPMI = 0 | 11 | 4 antenna ports 4 layers: TPMI = 0 | 11 | 4 antenna ports 4 layers: TPMI = 0 |
| 12 | 4 antenna ports 1 layer: TPMI = 4 | 12 | 4 antenna ports 1 layer: TPMI = 4 | 12 | 2 antenna ports 1 layer: TPMI = 0 |
| ... | ... | ... | ... | 13 | 2 antenna ports 1 layer: TPMI = 1 |
| 19 | 4 antenna ports 1 layer: TPMI = 11 | 19 | 4 antenna ports 1 layer: TPMI = 11 | 14 | 2 antenna ports 2 layers: TPMI = 0 |
| 20 | 4 antenna ports 2 layers: TPMI = 6 | 20 | 4 antenna ports 2 layers: TPMI = 6 | 15 | 1 antenna port 1 layer |
| ... | ... | ... | ... | | |
| 27 | 4 antenna ports 2 layers: TPMI = 13 | 27 | 4 antenna ports 2 layers: TPMI = 13 | | |
| 28 | 4 antenna ports 3 layers: TPMI = 1 | 28 | 4 antenna ports 3 layers: TPMI = 1 | | |
| 29 | 4 antenna ports 3 layers: TPMI = 2 | 29 | 4 antenna ports 3 layers: TPMI = 2 | | |
| 30 | 4 antenna ports 4 layers: TPMI = 1 | 30 | 4 antenna ports 4 layers: TPMI = 1 | | |
| 31 | 4 antenna ports 4 layers: TPMI = 2 | 31 | 4 antenna ports 4 layers: TPMI = 2 | | |
| 32 | 4 antenna ports 1 layers: TPMI = 12 | 32 | 1 antenna port 1 layer | | |
| ... | ... | 33 to 63 | Reserved | | |
| 47 | 4 antenna ports 1 layers: TPMI = 27 | | | | |
| 48 | 4 antenna ports 2 layers: TPMI = 14 | | | | |
| ... | ... | | | | |
| 55 | 4 antenna ports 2 layers: TPMI = 21 | | | | |
| 56 | 4 antenna ports 3 layers: TPMI = 3 | | | | |
| ... | ... | | | | |
| 59 | 4 antenna ports 3 layers: TPMI = 6 | | | | |
| 60 | 4 antenna ports 4 layers: TPMI = 3 | | | | |
| 61 | 4 antenna ports 4 layers: TPMI = 4 | | | | |
| 62 | 2 antenna ports 1 layer: TPMI = 0 | | | | |
| 63 | 2 antenna ports 1 layer: TPMI = 1 | | | | |

TABLE 12-continued

The number of antenna ports, the precoding information and the number of layers of at most 4 antenna ports (transform precoder is disabled and maxrank = 2, 3 or 4)

| Bit field mapped to index | CodebookSubset parameter being fullyAndPartialAndNonCoherent | Bit field mapped to index | CodebookSubset parameter being partialAndNonCoherent | Bit field mapped to index | CodebookSubset parameter being nonCoherent |
|---|---|---|---|---|---|
| 64 | 2 antenna ports<br>2 layers: TPMI = 0 | | | | |
| 65 | 2 antenna ports<br>1 layer: TPMI = 2 | | | | |
| 66 | 2 antenna ports<br>1 layer: TPMI = 3 | | | | |
| 67 | 2 antenna ports<br>1 layer: TPMI = 4 | | | | |
| 68 | 2 antenna ports<br>1 layer: TPMI = 5 | | | | |
| 69 | 2 antenna ports<br>2 layers: TPMI = 1 | | | | |
| 70 | 2 antenna ports<br>2 layers: TPMI = 2 | | | | |
| 71 | 1 antenna port<br>1 layer | | | | |
| 72 to 127 | Reserved | | | | |

The advantage of dividing the SRS information into two parts to be indicated is that the overhead of the DCI indicating the SRI is saved. In the first example implementation described above, if the SRI is indicated in one field, 3 bits are required; when the 3 bits are allocated for two fields, the first SRS information requires 1 bit, and the additional indication of the second SRS information only adds 1 bit to the field of precoding information and number of layers, or no additional bit is added. In the case where the maximum number of antenna ports is 4 and the maximum rank is 2, 3, or 4, 1 bit is added for the UE whose codebookSubset parameter is fullyAndPartialAndNonCoherent or partialAndNonCoherent, and no bit is added for the UE whose codebookSubset parameter is nonCoherent. It is equivalent to that the SRS information only needs a 1-bit or 2-bit overhead in the DCI, and 1 bit to 2 bits are saved compared to the 3-bit overhead. In the case of 1 antenna port and 1 layer, no multiple antennas exist, so that no TPMI is configured for indicating the precoding.

In the case where the maximum number of antenna ports is 4 and the maximum rank is 1, as shown in Table 13 below, no bit is added for the UE whose codebookSubset parameter is nonCoherent or partialAndNonCoherent, and 1 bit is added for the UE whose codebookSubset parameter is fullyAndPartialAndNonCoherent.

TABLE 13

The number of antenna ports, the precoding information and the number of layers of at most 4 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being partialAndNonCoherent | Bit field mapped to index | CodebookSubset parameter being nonCoherent |
|---|---|---|---|---|---|
| 0 | 4 antenna ports<br>1 layer: TPMI = 0 | 0 | 4 antenna ports<br>1 layer: TPMI = 0 | 0 | 4 antenna ports<br>1 layer: TPMI = 0 |
| 1 | 4 antenna ports<br>1 layer: TPMI = 1 | 1 | 4 antenna ports<br>1 layer: TPMI = 1 | 1 | 4 antenna ports<br>1 layer: TPMI = 1 |
| ... | ... | ... | ... | ... | ... |
| 3 | 4 antenna ports<br>1 layer: TPMI = 3 | 3 | 4 antenna ports<br>1 layer: TPMI = 3 | 3 | 4 antenna ports<br>1 layer: TPMI = 3 |
| 4 | 4 antenna ports<br>1 layer: TPMI = 4 | 4 | 4 antenna ports<br>1 layer: TPMI = 4 | 4 | 2 antenna ports<br>1 layer: TPMI = 0 |
| ... | ... | ... | ... | 5 | 2 antenna ports<br>1 layer: TPMI = 1 |
| 11 | 4 antenna ports<br>1 layer: TPMI = 11 | 11 | 4 antenna ports<br>1 layer: TPMI = 11 | 6 | 1 antenna port<br>1 layer |
| 12 | 4 antenna ports<br>1 layers: TPMI = 12 | 12 | 1 antenna port<br>1 layer | 7 | Reserved |
| ... | ... | 13 to 15 | Reserved | | |
| 27 | 4 antenna ports<br>1 layers: TPMI = 27 | | | | |
| 28 | 2 antenna ports<br>1 layer: TPMI = 0 | | | | |
| 29 | 2 antenna ports<br>1 layer: TPMI = 1 | | | | |
| 30 | 2 antenna ports<br>1 layer: TPMI = 2 | | | | |
| 31 | 2 antenna ports<br>1 layer: TPMI = 3 | | | | |

TABLE 13-continued

The number of antenna ports, the precoding information and the number of layers of
at most 4 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being partialAndNonCoherent | Bit field mapped to index | CodebookSubset parameter being nonCoherent |
|---|---|---|---|---|---|
| 32 | 2 antenna ports 1 layer: TPMI = 4 | | | | |
| 33 | 2 antenna ports 1 layer: TPMI = 5 | | | | |
| 34 | 1 antenna port 1 layer | | | | |
| 35 to 63 reserved | | | | | |

In the case where maxRank=2 or maxRank=3, tables may be independently configured to reduce the overhead.

Referring to Table 12, it can be seen that Table 12 corresponds to the case where maxRank=2 or 3 or 4. According to requirements, Table 12 may also be divided into 3 tables, respectively corresponding to that maxRank=2, maxRank=3, and maxRank=4. The value of information about the precoding information and the number of layers in the case where maxRank=2 or maxRank=3 is a subset of the value of information about the precoding information and the number of layers in the case where maxRank=4. Therefore, the number of bits for the field of precoding information and number of layers in the case where maxRank=2 or maxRank=3 may be less than the number of bits for the field of precoding information and number of layers in the case where maxRank=4.

For example, the SRS resource set supports 4 SRS resources. These 4 SRS resources are divided into 2 groups. The first group includes SRI 0-0 and SRI 0-1, and supported numbers of ports are 2 and 1, respectively. The second group includes SRI 1-0 and SRI 1-1, and supported numbers of ports are 2 and 1, respectively. Since the SRS resource set includes two groups of SRS resources, the DCI includes the 1-bit field for indicating the first SRS information. 0 represents the first group, and 1 represents the second group.

The second SRS information refers to a serial number of an SRI in the SRI group indicated by the first SRS information, and this information is indicated jointly with the precoding information and the number of layers. The number of antenna ports of the second SRS information is obtained according to the information field jointly indicated by the second SRS information, the precoding information and the number of layers, and the serial number of the SRI in the SRI group is determined according to the number of antenna ports.

The advantage of dividing the SRS information into two parts to be indicated is that the overhead of the DCI indicating the SRI is saved. If the SRI of the above 4 SRS resources is indicated in one field, 2 bits are required; when the 2 bits are allocated for two fields, the first SRS information requires 1 bit, and the additional indication of the second SRS information only adds 1 bit to the field of precoding information and number of layers, or no additional bit is added. Referring to Table 14, in the case where the maximum number of antenna ports is 4 and the maximum rank is 2, no bit is added. It is equivalent to that the SRS information only needs the 1-bit or 2-bit overhead in the DCI, and 1 bit is saved compared to the 2-bits overhead in some cases. It is to be noted that in the case of 1 antenna port and 1 layer, there are no multiple antennas, so that no TPMI is configured for indicating the precoding.

TABLE 14

The number of antenna ports, the precoding information
and the number of layers of at most 2 antenna ports
(transform precoder is disabled, and maxrank = 2)

| Bit field mapped to index | CodebookSubset parameter being fullyAndPartialAndNonCoherent | Bit field mapped to index | CodebookSubset parameter being nonCoherent |
|---|---|---|---|
| 0 | 2 antenna ports 1 layer: TPMI = 0 | 0 | 2 antenna ports 1 layer: TPMI = 0 |
| 1 | 2 antenna ports 1 layer: TPMI = 1 | 1 | 2 antenna ports 1 layer: TPMI = 1 |
| 2 | 2 antenna ports 2 layers: TPMI = 0 | 2 | 2 antenna ports 2 layers: TPMI = 0 |
| 3 | 2 antenna ports 1 layer: TPMI = 2 | 3 | 1 antenna port 1 layer |
| 4 | 2 antenna ports 1 layer: TPMI = 3 | | |
| 5 | 2 antenna ports 1 layer: TPMI = 4 | | |
| 6 | 2 antenna ports 1 layer: TPMI = 5 | | |
| 7 | 2 antenna ports 2 layers: TPMI = 1 | | |
| 8 | 2 antenna ports 2 layers: TPMI = 2 | | |
| 9 | 1 antenna port 1 layer | | |
| 10 to 15 Reserved | | | |

In the case where the maximum number of antenna ports is 2 and the maximum rank is 1, referring to Table 15, 1 bit is added for the UE whose codebookSubset parameter is nonCoherent, and no bit is added for the UE whose codebookSubset parameter is fullyAndPartialAndNonCoherent.

TABLE 15

The number of antenna ports, the precoding information
and the number of layers of at most 2 antenna ports (transform
precoder is enabled or disabled, and maxrank = 1)

| Bit field mapped to index | CodebookSubset parameter being fullyAndPartialAndNonCoherent | Bit field mapped to index | CodebookSubset parameter being nonCoherent |
|---|---|---|---|
| 0 | 2 antenna ports 1 layer: TPMI = 0 | 0 | 2 antenna ports 1 layer: TPMI = 0 |
| 1 | 2 antenna ports 1 layer: TPMI = 1 | 1 | 2 antenna ports 1 layer: TPMI = 1 |
| 2 | 2 antenna ports 1 layer: TPMI = 2 | 2 | 1 antenna port 1 layer |

TABLE 15-continued

The number of antenna ports, the precoding information and the number of layers of at most 2 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being nonCoherent |
|---|---|---|---|
| 3 | 2 antenna ports 1 layer: TPMI = 3 | 3 | reserved |
| 4 | 2 antenna ports 1 layer: TPMI = 4 | | |
| 5 | 2 antenna ports 1 layer: TPMI = 5 | | |
| 6 | 1 antenna port 1 layer | | |
| 7 | reserved | | |

In the related art, when the codebook based PUSCH transmission is sent by using multiple antenna ports, each antenna port may only use a maximum of 1/N of the maximum transmission power, and N is the maximum number of antenna ports supported by the UE. When the precoding matrix corresponding to the TPMI has an antenna port having 0-element on all layers, it represents that the PUSCH transmission has no power on the antenna port. The sum of power of other antenna ports cannot reach the maximum transmission power of the UE. For example, for the precoding matrix $$\frac{1}{\sqrt{2}}\begin{bmatrix}1\\0\end{bmatrix}$$

indicated by TPMI 0 in Table 1, since one antenna port is 0, only half of the power is supported for sending. With the development of technologies, the cost of components becomes increasingly low, and it becomes possible for a single antenna port to support the full power.

Furthermore, in the related art, as shown in Tables 2 to 5, when the codebookSubset parameter is fullyAndPartialAndNonCoherent, the universal set of the TPMI indicated for the UE is supported, when the codebookSubset parameter is partialAndNonCoherent or NonCoherent, the TPMI indicated for the UE only supports a part of the TPMI set. The reason for that is to avoid simultaneous transmissions of antenna ports without coherent capability. For example, for a UE of 2 antenna ports and with the non-coherent capability, when 1 layer of a transmission is sent, the precoding matrix selected by the antenna port, such as $$\frac{1}{\sqrt{2}}\begin{bmatrix}1\\0\end{bmatrix},$$

may only be used, and the precoding matrix with 2 antenna ports, such as $$\frac{1}{\sqrt{2}}\begin{bmatrix}1\\1\end{bmatrix},$$

cannot be used. As a result, 2 antenna ports cannot be used when 1 layer of the transmission is sent, thus the full power cannot be reached.

In order to solve the above problems, the present application improves the related art from two aspects.

For the first mode, the TPMI set that is supported by a UE whose codebookSubset parameter is partialAndNonCoherent or NonCoherent is extended.

For the second mode, the base station configures at least one SRS resource set for the UE, and the SRS resource set includes at least one SRS resource. When the number of SRS resources is greater than 1, the number of ports supported by the SRS resources may be different. The power capability reachable by the UE, which is determined according to the TPMI, is supported.

For example, the UE supports maximum 4 antenna ports, and the base station configures 1 SRS resource set with the usage of the codebook for the UE, and the SRS resource set includes 3 SRS resources. Numbers of ports supported by the 3 SRS resources are 4, 2, and 1, respectively.

The number of ports supported by the SRS resource with 2 ports and the number of ports supported by the SRS resource with 1 port are less than the maximum number 4 of ports, so these two SRS resources may be virtual ports, that is, the port formed by multiple physical antenna chains, or the UE may decide to use only a part of the physical antenna chains to send uplink transmissions of 2-port and 1-port. In summary, the physical antenna chains are transparent to the base station. Therefore, the UE needs to inform the base station of power capabilities of the UE in different TPMIs of the SRS resources with different numbers of ports.

In a third example implementation, the present application supports one of the extension manners described below for the first mode.

In manner one, for a UE whose codebookSubset parameter is partialAndNonCoherentnonCoherent, the supported TPMI set is extended to a universal set of a TPMI set whose codebookSubset parameter is fullyAndPartialAndNonCoherent.

For a UE whose codebookSubset parameter is partialAndNonCoherent or nonCoherent, the precoding matrix of a newly extended TPMI exceeds the coherent capability of the UE. Therefore, the base station does not require the UE to send the uplink transmission in a phase difference of antenna ports required by the precoding matrix corresponding to the TPMI. For the precoding matrix of the TPMI that exceeds the coherent capability of the UE, the UE may change the phase difference of the antenna ports.

In manner two, for a UE whose codebookSubset parameter is partialAndNonCoherent or nonCoherent, the supported TPMI set is extended to a subset of a TPMI set whose codebookSubset parameter is fullyAndPartialAndNonCoherent, as shown in Tables 16, 17, 18 and 19.

TABLE 16

The precoding information and the number of layers of 4 antenna ports (transform precoder is disabled, and maxrank = 2, 3, or 4)

| Bit field CodebookSubset mapped to index | parameter being fullyAndPartialAndNonCoherent | Bit field CodebookSubset mapped to index | parameter being partialAndNonCoherent | Bit field CodebookSubset mapped to index | parameter being nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12 | 1 layer: TPMI = 4 |
| ... | ... | ... | ... | 13 | 1 layer: TPMI = 8 |
| | | | | 14 | 1 layer: TPMI = 12 |
| | | | | 15 | 2 layers: TPMI = 6 |
| | | | | 16 | 2 layers: TPMI = 14 |
| | | | | 17 | 3 layers: TPMI = 1 |
| | | | | 18 | 3 layers: TPMI = 3 |
| 19 | 1 layer: TPMI = 11 | 19 | 1 layer: TPMI = 11 | 19 | 4 layers: TPMI = 1 |
| 20 | 2 layers: TPMI = 6 | 20 | 2 layers: TPMI = 6 | 20 | 4 layers: TPMI = 3 |
| ... | ... | ... | ... | 21-31 | reserved |
| 27 | 2 layers: TPMI = 13 | 27 | 2 layers: TPMI = 13 | | |
| 28 | 3 layers: TPMI = 1 | 28 | 3 layers: TPMI = 1 | Or | |
| 29 | 3 layers: TPMI = 2 | 29 | 3 layers: TPMI = 2 | 12 | 1 layer: TPMI = 4 |
| 30 | 4 layers: TPMI = 1 | 30 | 4 layers: TPMI = 1 | 13 | 1 layer: TPMI = 8 |
| 31 | 4 layers: TPMI = 2 | 31 | 4 layers: TPMI = 2 | 14 | 2 layers: TPMI = 6 |
| 32 | 1 layer: TPMI = 12 | 32 | 1 layer: TPMI = 12 | 15 | 3 layers: TPMI = 1 |
| | | 33 to 63 | Reserved | 16 | 4 layers: TPMI = 1 |
| 47 | 1 layers: TPMI = 27 | Or | | 17 | 1 layer: TPMI = 12 |
| 48 | 2 layers: TPMI = 14 | 32 | 1 layer: TPMI = 12 | 18 | 2 layers: TPMI = 14 |
| ... | ... | 33 | 2 layers: TPMI = 14 | 19 | 3 layers: TPMI = 3 |
| 55 | 2 layers: TPMI = 21 | 34 | 3 layers: TPMI = 3 | 20 | 4 layers: TPMI = 3 |
| 56 | 3 layers: TPMI = 3 | 35 | 4 layers: TPMI = 3 | 21-31 | reserved |
| ... | ... | 36-63 | Reserved | Or | |
| 59 | 3 layers: TPMI = 6 | | | 12 | 1 layer: TPMI = 12 |
| 60 | 4 layers: TPMI = 3 | | | 13 | 2 layers: TPMI = 6 |
| 61 | 4 layers: TPMI = 4 | | | 14 | 3 layers: TPMI = 1 |
| 62 to 63 | Reserved | | | 15 | 4 layers: TPMI = 1 |

TABLE 17

The precoding information and the number of layers of 4 antenna ports (transform precoder is enabled or disabled, and maxrank = 1)

| Bit field CodebookSubset mapped to index | parameter being fullyAndPartialAndNonCoherent | Bit field CodebookSubset mapped to index | parameter being partialAndNonCoherent | Bit field CodebookSubset mapped to index | parameter being nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | 4 | 1 layer: TPMI = 4 |
| ... | ... | ... | ... | 5 | 1 layer: TPMI = 8 |
| | | | | 6 | 1 layer: TPMI = 12 |
| | | | | 7 | reserved |
| 11 | 1 layer: TPMI = 11 | 11 | 1 layer: TPMI = 11 | Or | |
| 12 | 1 layers: TPMI = 12 | 12 | 1 layer: TPMI = 12 | 4 | 1 layer: TPMI = 12 |
| ... | ... | 13-15 | Reserved | 5~7 | reserved |
| 27 | 1 layers: TPMI = 27 | | | | |
| 28 to 31 | Reserved | | | | |

TABLE 18

The precoding information and the number of layers of 2 antenna ports (transform precoder is disabled, and maxrank = 2)

| Bit field mapped to index | CodebookSubset parameter being fullyAndPartialAndNonCoherent | Bit field mapped to index | CodebookSubset parameter being nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | 1 layer: TPMI = 2 |
| 4 | 1 layer: TPMI = 3 | Or: | |
| 5 | 1 layer: TPMI = 4 | 3 | 1 layer: TPMI = 2 |
| 6 | 1 layer: TPMI = 5 | 4 | 2 layer: TPMI = 1 |
| 7 | 2 layers: TPMI = 1 | | |
| 8 | 2 layers: TPMI = 2 | | |
| 9 to 15 | reserved | | |

TABLE 19

The precoding information and the number of layers of 2 antenna ports (transform precoder is enabled or disabled, and maxrank = 1)

| Bit field mapped to index | CodebookSubset parameter being fullyAndPartialAndNonCoherent | Bit field mapped to index | CodebookSubset parameter being nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | 2 | 1 layer: TPMI = 2 |
| 3 | 1 layer: TPMI = 3 | 3 | reserved |
| 4 | 1 layer: TPMI = 4 | | |
| 5 | 1 layer: TPMI = 5 | | |
| 6 to 7 | reserved | | |

In the case of the number of antenna ports being 4, for the UE whose codebookSubset parameter is nonCoherent, the field of precoding information and number of layers needs to be extended, and at least one of the following cases is included.

1 layer: TPMI=4; 1 layer: TPMI=8; 1 layer: TPMI=12; 2 layers: TPMI=6; 2 layers: TPMI=14; 3 layers: TPMI=1; 3 layers: TPMI=3; 4 layers: TPMI=1; or 4 layers: TPMI=3.

In the case of the number of antenna ports being 4, for the UE whose codebookSubset parameter is partialAndNonCoherent, the field of precoding information and number of layers needs to be extended, and at least one of the following cases is included.

1 layer: TPMI=12; 2 layers: TPMI=14; 3 layers: TPMI=3; or 4 layers: TPMI=3.

The correspondence relationship between the extended information about the precoding information and the number of layers and values of the field of precoding information and number of layers may be implemented in multiple manners, as shown in Table 16 and Table 17.

Table 16 corresponds to the case where maxRank=2 or 3 or 4. According to requirements, Table 16 may also be divided into 3 tables, respectively corresponding to the cases where maxRank=2, maxRank=3, and maxRank=4. The value of the information about the precoding information and the number of layers in the case where maxRank=2, or maxRank=3 is a subset of the value of the information about the precoding information and the number of layers in the case where maxRank=4. Therefore, the number of bits for the field of precoding information and number of layers in the case where maxRank=2 or maxRank=3 may be less than the number of bits for the field of precoding information and number of layers in the case where maxRank=4.

When the number of antenna ports is 2, for a UE whose codebookSubset parameter is nonCoherent, the field of precoding information and number of layers needs to be extended, and at least one of the following cases is included.

1 layer: TPMI=2; or 2 layers: TPMI=1.

The correspondence relationship between the extended information about the precoding information and the number of layers and values of the field of precoding information and number of layers may be implemented in multiple manners, as shown in Table 18 and Table 19.

In manner three, for a UE whose codebookSubset parameter is partialAndNonCoherent or nonCoherent, the supported TPMI set is extended to a supported new TPMI set. The new TPMI set is mainly for the case where the phase difference between ports that do not have the coherent capability is any phase difference, or for the case where the phase difference is determined by the UE, as shown in Tables 20, 21, 22, 23, 24, and 25.

TABLE 20

The precoding matrix W using two antenna ports for a single-layer transmission

| TPMI index | W (Ordered from left to right in ascending order of TPMI indices) |
|---|---|
| 0 to 6 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — |

Note: $\alpha$ is a constant modulus complex number

TABLE 21

The precoding matrix W using four antenna ports for a single-layer transmission in the case of transform precoder being enabled

| TPMI index | W (Ordered from left to right in ascending order of TPMI indices) |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

TABLE 21-continued

The precoding matrix W using four antenna ports for a single-layer transmission in the case of transform precoder being enabled

| TPMI index | W (Ordered from left to right in ascending order of TPMI indices) |
|---|---|
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $-\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24 to 30 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 32 to 38 | $\frac{1}{2}\begin{bmatrix}1\\\alpha\\-1\\-\alpha\end{bmatrix}$ $\frac{1}{2}\begin{bmatrix}1\\\alpha\\-j\\j\alpha\end{bmatrix}$ |
| Note: | $\alpha$, $\beta$ and $\gamma$ are constant modulus complex numbers |

TABLE 22

The precoding matrix W using four antenna ports for a single-layer transmission in the case of transform precoder being disabled

| TPMI index | W (Ordered from left to right in ascending order of TPMI indices) |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24 to 31 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ $\frac{1}{2}\begin{bmatrix}1\\0\\\alpha\\0\end{bmatrix}$ $\frac{1}{2}\begin{bmatrix}0\\1\\0\\\alpha\end{bmatrix}$ $\frac{1}{2}\begin{bmatrix}1\\\alpha\\\beta\\\gamma\end{bmatrix}$ $\frac{1}{2}\begin{bmatrix}1\\\alpha\\1\\\alpha\end{bmatrix}$ |
| 32 to 34 | $\frac{1}{2}\begin{bmatrix}1\\\alpha\\j\\j\alpha\end{bmatrix}$ $\frac{1}{2}\begin{bmatrix}1\\\alpha\\-1\\-\alpha\end{bmatrix}$ $\frac{1}{2}\begin{bmatrix}1\\\alpha\\-j\\-j\alpha\end{bmatrix}$ |
| Note | $\alpha$, $\beta$ and $\gamma$ are constant modulus complex numbers |

TABLE 23

The precoding matrix W using two antenna ports for a two-layer transmission in the case of transform precoder being disabled

| TPMI index | W (Ordered from left to right in ascending order of TPMI indices) | | |
|---|---|---|---|
| 0 to 2 | $\frac{1}{\sqrt{2}}\begin{bmatrix} 1 & 0 \\ 0 & 1 \end{bmatrix}$ | $\frac{1}{2}\begin{bmatrix} 1 & 1 \\ 1 & -1 \end{bmatrix}$ | $\frac{1}{2}\begin{bmatrix} 1 & 1 \\ j & -j \end{bmatrix}$ |

TABLE 24

The precoding matrix W using four antenna ports for a two-layer transmission in the case of transform precoder being disabled

| TPMI index | W (Ordered from left to right in ascending order of TPMI indices) | | | |
|---|---|---|---|---|
| 0 to 3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4 to 7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8 to 11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12 to 15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16 to 19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20 to 22 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | $\frac{1}{2}\begin{bmatrix} 1 & 0 \\ 0 & 1 \\ \alpha & 0 \\ 0 & \beta \end{bmatrix}$ | — |

Note: α and β are constant modulus complex numbers

TABLE 25

The precoding matrix W using four antenna ports for a three-layer transmission in the case of transform precoder being disabled

| TPMI index | W (Ordered from left to right in ascending order of TPMI indices) | | | |
|---|---|---|---|---|
| 0 to 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $-\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 to 7 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | $\frac{1}{2}\begin{bmatrix} 1 & 0 & 0 \\ 0 & 1 & 0 \\ e^{j\alpha} & 0 & 0 \\ 0 & 0 & 1 \end{bmatrix}$ |

Note: α is a constant modulus complex number

The new TPMI set includes at least one of the precoding matrices described below.

$$\frac{1}{\sqrt{2}}\begin{bmatrix}1\\ \alpha\end{bmatrix}, \frac{1}{2}\begin{bmatrix}1\\ 0\\ \alpha\\ 0\end{bmatrix}, \frac{1}{2}\begin{bmatrix}0\\ 1\\ 0\\ \alpha\end{bmatrix}, \frac{1}{2}\begin{bmatrix}1\\ \alpha\\ \beta\\ \gamma\end{bmatrix}, \frac{1}{2}\begin{bmatrix}1\\ \alpha\\ 1\\ \alpha\end{bmatrix}, \frac{1}{2}\begin{bmatrix}1\\ \alpha\\ j\\ j\alpha\end{bmatrix}, \frac{1}{2}\begin{bmatrix}1\\ \alpha\\ -1\\ -\alpha\end{bmatrix},$$

$$\frac{1}{2}\begin{bmatrix}1\\ \alpha\\ -j\\ -j\alpha\end{bmatrix}, \frac{1}{2}\begin{bmatrix}1\\ \alpha\\ 1\\ -\alpha\end{bmatrix}, \frac{1}{2}\begin{bmatrix}1\\ j\alpha\\ j\\ \alpha\end{bmatrix}, \frac{1}{2}\begin{bmatrix}1\\ \alpha\\ -1\\ \alpha\end{bmatrix}, \frac{1}{2}\begin{bmatrix}1\\ \alpha\\ -j\\ j\alpha\end{bmatrix}, \frac{1}{2}\begin{bmatrix}1 & 0\\ 0 & 1\\ \alpha & 0\\ 0 & \beta\end{bmatrix}, \text{ or } \frac{1}{2}\begin{bmatrix}1 & 0 & 0\\ 0 & 1 & 0\\ \alpha & 0 & 0\\ 0 & 0 & 1\end{bmatrix},$$

where $\alpha$, $\beta$ and $\gamma$ are all constant modulus complex numbers.

In the case of using these new TPMIs, the value of the extended TPMI of the codebook set may also be updated.

In the case of the number of antenna ports being 4, for the UE whose codebookSubset parameter is nonCoherent, the field of precoding information and number of layers needs to be extended, and at least one of the cases described below is included.

1 layer: TPMI=28; 1 layer: TPMI=29; 1 layer: TPMI=30 (see Table 21 or 22); 2 layers: TPMI=22 (see Table 24); or 3 layers: TPMI=7 (see Table 25).

In the case of the number of antenna ports being 4, for the UE whose codebookSubset parameter is partialAndNonCoherent, the field of precoding information and number of layers needs to be extended, and at least one of the cases described below is included.

1 layer: TPMI=31; 1 layer: TPMI=32; 1 layer: TPMI=33; 1 layer: TPMI=34 (see Table 21 or 22); 1 layer: TPMI=35; 1 layer: TPMI=36; 1 layer: TPMI=37; or 1 layer: TPMI=38 (see Table 21).

In the case of the number of antenna ports being 2, for the UE whose codebookSubset parameter is nonCoherent, the field of precoding information and number of layers needs to be extended, and at least one of the cases described below is included.

1 layer: TPMI=5 (see Table 20).

A fourth example implementation is a design of reporting the power capability based on a TPMI (group)/an antenna port.

For the second mode, it is supported that the reachable power capability is determined according to the TPMI.

The UE reports the power capabilities of the TPMIs supported by the UE for different numbers of ports.

It is assumed that the TPMI set supported by the UE is not extended, that is, the TPMIs supported by the UE are shown in Tables 2 to 5, and the UE reports the power capabilities that may be reached by all TPMIs supported by the UE.

In an embodiment, the UE reports the power capabilities of TPMIs having precoding matrices with all-zero-ports for different numbers of ports, and the TPMIs are in a TPMI set supported by the UE.

It is assumed that the TPMI set supported by the UE is not extended, that is, the TPMIs supported by the UE are shown in Tables 2 to 5, the UE reports the power capabilities of TPMIs having precoding matrices with all-zero-ports in view of different numbers of ports, and the TPMIs are in the TPMI set supported by the UE.

The TPMI having the precoding matrix with an all-zero-port refers to that the precoding matrix corresponding to the TPMI has a row with all elements of 0. Rows of the precoding matrix are in one-to-one correspondence with antenna ports, that is, the row with all elements of 0 corresponds to an antenna port with all precoding elements of 0, which is also referred to as a zero-power antenna port. For example, the second row of the precoding matrix $$\frac{1}{\sqrt{2}}\begin{bmatrix}1\\ 0\end{bmatrix}$$

corresponding to TPMI 0 in Table 1 is all 0, and the UE should report the power capability supported by this TPMI. For another example, the third and fourth rows of the precoding matrix $$\frac{1}{2}\begin{bmatrix}1 & 0\\ 0 & 1\\ 0 & 0\\ 0 & 0\end{bmatrix}$$

corresponding to TPMI 0 in Table 8 are all 0, and the UE should report the power capability supported by this TPMI.

In an embodiment, when the number of antenna ports is 4, the TPMI with an all-zero-port includes at least one of the cases described below.

1 layer: TPMI=0, 1, . . . or 11; 2 layers: TPMI=0, 1, 2, 3, 4, or 5; or 3 layers: TPMI=0.

In the case of the number of antenna ports being 2, the TPMI with an all-zero port includes at least one of the cases described below.

1 layer: TPMI=0 or 1.

In an embodiment, according to the coherent capability of the UE, it is only supported that a UE of the non-coherent capability or the partially coherent capability reports the power capability of the TPMI supported by the UE.

In an embodiment, according to the coherent capability of the UE, it is only supported that a UE of the non-coherent capability or the partially coherent capability reports the power capabilities of TPMIs having precoding matrices with all-zero-ports respectively in view of different numbers of ports, and the TPMIs are in the TPMI set supported by the UE.

In an embodiment, the UE of the coherent capability reports the power capabilities of TPMIs having precoding matrices with all-zero ports respectively in view of different numbers of ports, and the TPMIs are in the TPMI set supported by the UE.

In an embodiment, it is supported that the UE of the second mode reports the power capabilities of TPMIs having precoding matrices with all-zero-ports respectively in view of different numbers of ports, and the TPMIs are in the TPMI set supported by the UE.

The reported power capability of the TPMI may be whether to reach the maximum transmission power of the UE or the maximum power class supported by the TPMI. The supported maximum power class refers to a ratio of the maximum power supported by the TPMI to the maximum transmission power of the UE, such as 1, ½, or ¼.

In addition to the above reporting of the power capability based on the TPMI, the UE may also report the power capability based on the antenna port.

The power capability of the antenna port may be the same as the power capability of the TPMI, that is, whether the maximum transmission power of the UE may be reached or the maximum power class supported by the antenna port. The supported maximum power class refers to the ratio of the maximum power independently supported by the antenna port to the maximum transmission power of the UE, such as 1, ½, or ¼.

For the UE supporting 4 antenna ports, serial numbers of antenna ports are 0, 1, 2, and 3, and the power capabilities independently supported by the 4 antenna ports are reported respectively. For example, the maximum power class supported by antenna port 0 is 1, the maximum power class supported by antenna port 1 is ½, and the maximum power classes supported by antenna ports 2 and 3 are both ¼. Each antenna port needs 2 bits, and the 4 antenna ports need 8 bits. If the power capability of the antenna port is expressed by whether to reach the maximum transmission power of the UE, each antenna port needs 1 bit. Only antenna port 0 can reach the maximum transmission power of the UE, and other antenna ports cannot reach the maximum transmission power of the UE, in this manner, the 4 antenna ports need 4 bits.

For the UE supporting 2 antenna ports, serial numbers of antenna ports are 0 and 1, and the power capabilities independently supported by the 2 antenna ports are reported respectively. For example, the maximum power class supported by antenna port 0 is 1, and the maximum power class supported by antenna port 1 is ½. Each antenna port needs 2 bits, and the 2 antenna ports need 4 bits. If the power capability of the antenna port is expressed by whether to reach the maximum transmission power of the UE, each antenna port needs 1 bit. Only antenna port 0 can reach the maximum transmission power of the UE, and antenna port 1 cannot reach the maximum transmission power of the UE, in this manner, the 2 antenna ports need 2 bits.

In an embodiment, due to the deployment features of multiple parameters (PA, such as UE-specific parameters) of an actual UE, the combination of TPMIs whose power needs to be reported may be optimized.

An all-zero-port is also referred to as a zero-port or a zero-power port.

The port described herein may include one of an antenna port, a reference signal port, an SRS port, or a demodulation reference signal (DMRS) port.

Due to the limitation of PAs in practical applications, the manner of the TPMI supporting the full power may be optimized.

The limitation of the PA may be that if only a part of antenna ports support the full power, the part of antenna ports supporting the full power are antenna ports whose serial numbers are relatively small or antenna ports ranking relatively high in a predefined antenna port order.

The UE supporting 4 antenna ports whose serial numbers are 0, 1, 2, and 3 may support the full power manners described below.

1. Only the antenna port whose serial number is 0 supports the full power; 2. only antenna ports whose serial numbers are 0 and 1 independently support the full power; 3. only antenna ports whose serial numbers are 0 and 2 independently support the full power; and 4. all 4 antennas ports independently support the full power.

The UE reports one of the above power capability information to the base station, and the base station obtains the power capability of the TPMI according to the power capability information, and determines the precoding matrix used for the transmission of the UE.

For 4 antenna ports, one of the above 4 manners needs to be indicated, and 2 bits are required.

For 2 antenna ports, one of the 2 manners described below needs to be indicated, and 1 bit is required.

1. Only the antenna port whose serial number is 0 supports the full power; 2. the antenna ports whose serial numbers are 0 and 1 independently support the full power.

In an embodiment, the UE may also only report the power capability of a TPMI which is for a single layer and has a single antenna port being non-zero-power. For a TPMI having multiple non-zero-power antenna ports and a multi-layer TPMI, the maximum supported power is determined by the power capability of the TPMI of a single layer and a single antenna port being non-zero-power.

For example, for 4 ports, only the maximum power of TPMIs 0 to 3 of 1 layer is reported. It is assumed that TPMI 0 and TPMI 1 support the maximum transmission power of the UE, and the maximum power supported by TPMI 2 and TPMI 3 is ¼ of the maximum transmission power of the UE. Then, the maximum power supported by TPMI 4, $$\frac{1}{2}\begin{bmatrix}1\\0\\1\\0\end{bmatrix},$$

in Table 7 may be 3/2 times the maximum transmission power of the UE. The maximum transmission power not exceeding the maximum transmission power of the UE is considered, the maximum power supported by TPMI 4 in Table 7 may be 1 time the maximum transmission power of the UE. It is similar for a multi-layer TPMI. For example, for TPMI 0 in Table 8, the corresponding matrix is $$\frac{1}{2}\begin{bmatrix}1 & 0\\0 & 1\\0 & 0\\0 & 0\end{bmatrix},$$

and the maximum supported power is 1 time the maximum transmission power of the UE.

The above manner of the port supporting the full power may also be used in the manner of the TPMI supporting the full power. For example, the UE supporting 4 antenna ports may support the full power manners described below.

1. TPMI 0 of 1 layer and 4 antenna ports supports the full power; 2. both TPMI 0 and TPMI 1 of 1 layer and 4 antenna ports support the full power; 3. both TPMI 0 and TPMI 2 of 1 layer and 4 antenna ports support the full power; and 4. all TPMI 0 to TPMI 3 of 1 layer and 4 antenna ports support the full power.

The UE reports one of the above power capability information to the base station, and the base station obtains the power capability of the TPMI according to the power capability information, and determines the precoding matrix used for the transmission of the UE.

For 4 antenna ports, one of the above 4 manners needs to be indicated, and 2 bits are required.

For 2 antenna ports, one of the 2 manners described below needs to be indicated, and 1 bit is required.

1. TPMI 0 of 1 layer and 2 antenna ports supports the full power; and 2. both TPMI 0 and TPMI 1 of 1 layer and 2 antenna ports support the full power.

In a fifth example implementation, limitations of configuring an SRS resource set are described.

For the first communication node, SRS resources in the SRS resource set have at least one of the features described below.

The number of SRS groups does not exceed a predefined value X1, for example, X1=2.

The number of spatial relations associated with the SRS resources in the SRS resource set does not exceed a predefined value X2, for example, X2=2.

The number of panels associated with the SRS resources in the SRS resource set does not exceed a predefined value X3.

The number of different port numbers among numbers of ports associated with the SRS resources in the SRS resource set does not exceed a predefined value X4, for example, X4=2. For a maximum of 2 ports and a non-coherent UE, the SRS resource set includes two SRS resources respectively configured with 1 port and 2 ports; for a maximum of 2 ports and a coherent UE, the SRS resource set includes 1 SRS resource configured with 2 ports. For a maximum of 4 ports and a non-coherent UE, the SRS resource set includes two SRS resources respectively configured with 1 port and 2 ports; for a maximum of 4 ports and a partially coherent UE, the SRS resource set includes two SRS resources respectively configured with 2 ports and 4 ports; for a maximum of 4 ports and a coherent UE, the SRS resource set includes 1 SRS resource configured with 4 ports.

The number of the SRS resources in the SRS resource set does not exceed a predefined value X5.

The number of open-loop power control parameters configured for the SRS resource set does not exceed a predefined value X6.

The number of closed-loop power control parameters configured for the SRS resource set does not exceed a predefined value X7.

The number of path loss measurement parameters configured for the SRS resource set does not exceed a predefined value X8.

The number of open-loop power control parameters configured for all SRS resources in the SRS resource set does not exceed a predefined value X9.

The number of closed-loop power control parameters configured for all SRS resources in the SRS resource set does not exceed a predefined value X10.

The number of path loss measurement parameters configured for all SRS resources in the SRS resource set does not exceed a predefined value X11.

Herein, values of X1 to X15 are positive integers.

Figure 5:
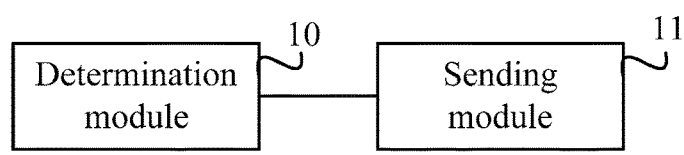
FIG. 5 is a structural diagram of a transmission device according to an embodiment.

FIG. 5 is a structural diagram of a transmission device according to an embodiment. The transmission device may be configured in a sending terminal. As shown in FIG. 5, the transmission device includes a determination module 10 and a sending module 11.

The determination module 10 is configured to determine a transmission mode of a first communication node and determine at least one of a codebook or a transmission power ratio according to the transmission mode; and the sending module 11 is configured to send the transmission according to the at least one of the codebook or the transmission power ratio.

The transmission device provided by the present embodiment is configured to implement the transmission method of embodiments shown in FIG. 1 and FIG. 2. The implementation principle and effects of the transmission device provided by the present embodiment are similar and are not repeated here.

Figure 6:
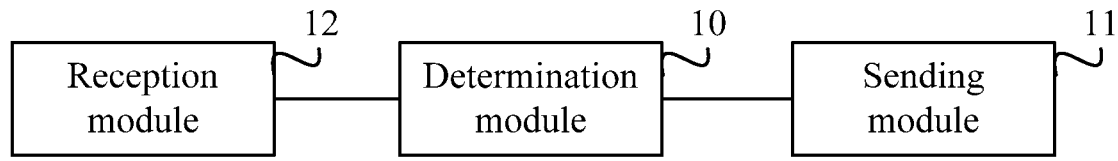
FIG. 6 is a structural diagram of another transmission device according to an embodiment.

In an embodiment, in conjunction with FIG. 5, FIG. 6 is a structural diagram of another transmission device according to an embodiment. The device further includes a reception module 12.

The reception module 12 is configured to receive the transmission mode sent by the second communication node.

In an embodiment, the transmission mode includes at least one of the first mode and the second mode.

In an embodiment, when the transmission mode is the first mode, the first communication has at least one of the features described below.

The first communication node sends one layer of a transmission on more than X ports. X is determined by the coherent capability of the first communication node. The first communication node sends the one layer of the transmission by using at least two ports without coherence. All SRS resources in an SRS resource set with the usage of codebook which is configured for the first communication node in the first mode support the same number of SRS ports.

In an embodiment, when the transmission coherent characteristic of the first communication node is non-coherent, X=1; and/or, when the transmission coherent characteristic of the first communication node is partially coherent, X=2.

In an embodiment, when the first communication node sends the one layer of the transmission by using the at least two ports without coherence, a phase difference between the at least two ports is random; or when a transmitted precoding matrix indicator (TPMI) exceeding the coherent capability of the first communication node is used, the first communication node is allowed to change a phase of an antenna port.

In an embodiment, when the transmission mode is the second mode, the first communication node has at least one of the features described below.

When the first communication node supports sending the transmission on ports whose number is less than a configured number of ports, or when an all-0 row exists in a precoding matrix corresponding to a TPMI used by the transmission, or when a zero-power port exists in a precoding matrix corresponding to a TPMI used by the transmission, power of each port is determined by a power capability of the first communication node; the number of different numbers among numbers of SRS ports supported by different SRS resources in an SRS resource set is greater than or equal to 1, and the SRS resource set with the usage of codebook is configured for the first communication node in the second mode.

In an embodiment, when the first transmission mode is the first mode, the determination module 10 is configured to support, by the first communication node whose codebookSubset parameter is partialAndNonCoherent or nonCoherent, the codebook including an extended TPMI set or support a full power state.

In an embodiment, the transmission supporting the full power state has at least one of the features described below.

The number of layers is 1; a TPMI is a reserved value; the transmission is sent by using all ports configured for an SRS resource related to the transmission; the transmission have the same power on all non-zero-power ports; precoding of the transmission has the same modulus value on all non-zero-power ports; phases of the precoding of the transmission on all non-zero-power ports depend on the first communication node; or the precoding of the transmission depends on the first communication node.

In an embodiment, the full power state is indicated in one of a full power state indication field in control information scheduling the transmission or a field of precoding information and number of layers.

In an embodiment, the extended TPMI set has at least one of the features described below.

The extended TPMI set is a universal set of a TPMI set whose codebookSubset parameter is fullyAndPartialAnd-NonCoherent; the extended TPMI set is a subset of the TPMI set whose codebookSubset parameter is fullyAndPartialAndNonCoherent; or a random phase difference exits between ports of a precoding matrix of the extended TPMI set.

In an embodiment, the extended TPMI set includes at least one of the precoding matrices described below.

$$\frac{1}{\sqrt{2}}\begin{bmatrix}1\\\alpha\end{bmatrix}, \frac{1}{2}\begin{bmatrix}1\\0\\\alpha\\0\end{bmatrix}, \frac{1}{2}\begin{bmatrix}0\\1\\0\\\alpha\end{bmatrix}, \frac{1}{2}\begin{bmatrix}1\\\alpha\\\beta\\\gamma\end{bmatrix}, \frac{1}{2}\begin{bmatrix}1\\\alpha\\1\\\alpha\end{bmatrix}, \frac{1}{2}\begin{bmatrix}1\\\alpha\\j\\j\alpha\end{bmatrix}, \frac{1}{2}\begin{bmatrix}1\\\alpha\\-1\\-\alpha\end{bmatrix},$$

$$\frac{1}{2}\begin{bmatrix}1\\\alpha\\-j\\-j\alpha\end{bmatrix}, \frac{1}{2}\begin{bmatrix}1\\\alpha\\1\\-\alpha\end{bmatrix}, \frac{1}{2}\begin{bmatrix}1\\j\alpha\\j\\\alpha\end{bmatrix}, \frac{1}{2}\begin{bmatrix}1\\\alpha\\-1\\\alpha\end{bmatrix}, \frac{1}{2}\begin{bmatrix}1\\\alpha\\-j\\j\alpha\end{bmatrix}, \frac{1}{2}\begin{bmatrix}1 & 0\\0 & 1\\\alpha & 0\\0 & \beta\end{bmatrix}, \text{ or } \frac{1}{2}\begin{bmatrix}1 & 0 & 0\\0 & 1 & 0\\\alpha & 0 & 0\\0 & 0 & 1\end{bmatrix},$$

where α, β and γ are all constant modulus complex numbers.

In an embodiment, values of the constant modulus complex numbers α, β and γ are determined by at least one of the parameters described below:

a serial number of a frequency domain unit, a serial number of a time domain unit, or a serial number of a modulate and coded symbol.

In an embodiment, the determination module 10 is configured to implement at least one of the methods described below.

In response to the transmission mode being the second mode, the transmission power ratio is determined according to a power capability of a TPMI of the transmission; in response to the transmission mode being the first mode, the transmission power ratio is determined according to the number of ports of an SRS resource corresponding to the transmission; or in response to the transmission mode being the first mode, the transmission power ratio is determined according to the maximum number of ports of all SRS resources in an SRS resource set corresponding to the transmission.

In an embodiment, the determination module 10 is configured to implement at least one of the methods described below.

A power capability of a universal set or a subset of a TPMI having a precoding matrix with a zero-port is sent to the second communication node, where the TPMI is in a TPMI set supported by the first communication node; power capabilities of universal sets or subsets of TPMIs having precoding matrices with zero-ports are sent to the second communication node, where the TPMIs are in the TPMI set supported by the first communication node and respectively correspond to different numbers of ports; a power capability supported by each port respectively corresponding to different numbers of ports is sent to the second communication node; at least one power capability of a power capability set supported by a predefined TPMI is sent to the second communication node; at least one power capability of a power capability set supported by a predefined port is sent to the second communication node; at least one power capability of a power capability set supported by a predefined TPMI and respectively corresponding to different numbers of ports is sent to the second communication node; or at least one power capability of a power capability set supported by a predefined port and respectively corresponding to different numbers of ports is sent to the second communication node.

In an embodiment, the power capability set supported by the predefined TPMI includes at least one of the power capabilities described below:

a power capability supported by TPMI 0 of 1 layer and 4 antenna ports; a power capability supported by TPMI 1 of 1 layer and 4 antenna ports; a power capability supported by TPMI 2 of 1 layer and 4 antenna ports; a power capability supported by TPMI 3 of 1 layer and 4 antenna ports; a full power capability supported by TPMI 0 of 1 layer and 4 antenna ports; a full power capability supported by both TPMI 0 and TPMI 1 of 1 layer and 4 antenna ports; a full power capability supported by both TPMI 0 and TPMI 2 of 1 layer and a 4 antenna ports; a full power capability supported by all TPMI 0 to TPMI 3 of 1 layer and 4 antenna ports; a power capability supported by TPMI 0 of 1 layer and 2 antenna ports; a power capability supported by TPMI 1 of 1 layer and 2 antenna ports; a full power capability supported by TPMI 0 of 1 layer and 2 antenna ports; or a full power capability supported by both TPMI 0 and TPMI 1 of 1 layer and 2 antenna ports.

In an embodiment, the power capability set supported by the predefined port includes at least one of the power capabilities described below:

a power capability supported by port 0 of 4 antenna ports; a power capability supported by port 1 of 4 antenna ports; a power capability supported by port 2 of 4 antenna ports; a power capability supported by port 3 of 4 antenna ports; a full power capability supported by port 0 of 4 antenna ports; a full power capability supported by both port 0 and port 1 of 4 antenna ports; a full power capability supported by both port 0 and port 2 of 4 antenna ports; a full power capability supported by all port 0 to port 3 of 4 antenna ports; a power capability supported by port 0 of 2 antenna ports; a power capability supported by port 1 of 2 antenna ports; a full power capability supported by port 0 of 2 antenna ports; or a full power capability supported by both port 0 and port 1 of 2 antenna ports.

In an embodiment, the first communication node includes at least one of the features described below.

In response to TPMI 0 of 1 layer and 4 antenna ports supporting the full power capability or port 0 of 4 antenna ports supporting the full power capability, a TPMI in a 4-antenna TPMI set supported by the first communication node and having a precoding matrix with non-zero port 0 supports the full power capability; in response to TPMI 1 of 1 layer and 4 antenna ports supporting the full power capability or port 1 of 4 antenna ports supporting the full power capability, a TPMI in a 4-antenna TPMI set supported by the first communication node and having a precoding matrix with non-zero port 1 supports the full power capability; in response to TPMI 2 of 1 layer and 4 antenna ports supporting the full power capability or port 2 of 4 antenna ports supporting the full power capability, a TPMI in a 4-antenna TPMI set supported by the first communication node and having a precoding matrix with non-zero port 2 supports the full power capability; in response to TPMI 3 of 1 layer and 4 antenna ports supporting the full power capability or port 3 of 4 antenna ports supporting the full power capability, a TPMI in a 4-antenna TPMI set supported by the first communication node and having a precoding matrix with non-zero port 3 supports the full power capability; in response to TPMI 0 of 1 layer and 2 antenna ports supporting the full power capability or port 0 of 2 antenna ports supporting the full power capability, a TPMI in a 2-antenna TPMI set supported by the first communication node and having a precoding matrix with non-zero port 0 supports the full power capability; or in response to TPMI 1 of 1 layer and 2 antenna ports supporting the full power capability or port 1 of 2 antenna ports supporting the full power capability, a TPMI in a 2-antenna TPMI set supported by the first communication node and having a precoding matrix with non-zero port 1 supports the full power capability; where a power capability of a TPMI supported by the first communication node is a smaller value between a sum of power supported by all non-zero ports of the TPMI and the maximum transmission power of the first communication node; and when the number of non-zero ports of the TPMI supported by the first communication node is zero, the TPMI supports the full power capability.

In an embodiment, the power capability includes at least one of whether to reach maximum transmission power of the first communication node; or a power class; where the power class is a ratio of the power capability to the maximum transmission power of the first communication node.

In an embodiment, the reception module 12 is further configured to receive scheduling information of the transmission sent by a second communication node.

In an embodiment, the scheduling information of the transmission is carried in at least one of the following information: radio resource control (RRC) signaling, a media access control control element (MAC CE), or physical layer signaling. The physical layer signaling includes at least one of a physical downlink control channel (PDCCH) or downlink control information (DCI).

In an embodiment, the number M of bits for a field of precoding information and number of layers in the physical layer signaling is determined by at least one of the items described below.

The maximum number of ports of an SRS resource in an SRS resource set corresponding to one of the transmission or the first communication node; the number of ports of an SRS resource corresponding to the transmission; the maximum rank or the maximum number of layers; the number of bits configured by the second communication node and for the field of precoding information and number of layers; or a predefined number of bits for the field of precoding information and number of layers.

In an embodiment, the precoding information and the number of layers indicated by a value of the field of precoding information and number of layers in the physical layer signaling are analyzed by at least one of the information described below.

The number of the ports of the SRS resource corresponding to the transmission; the maximum rank or the maximum number of layers of the first communication node; or the actual maximum rank or the actual maximum number of layers.

In an embodiment, in response to the number of the ports of the SRS resource corresponding to the transmission is less than the maximum number of the ports of the SRS resource in the SRS resource set, the number of necessary indication bits for the precoding information and the number of layers corresponding to the transmission is N, where N is less than or equal to M.

In an embodiment, the M bits for the field of precoding information and number of layers in the physical layer signaling include the N necessary indication bits for the precoding information and the number of layers, and the remaining (M−N) bits are preset values or a repetition of the N necessary indication bits for the precoding information and the number of layers.

In an embodiment, the physical layer signaling includes SRS information, and the SRS information is used to indicate an SRS resource in an SRS resource set of the first communication node.

In an embodiment, the SRS resource is associated with at least one of a spatial relation, a panel, or a beam.

In an embodiment, the SRS resource in the SRS resource set is determined according to one of the features described below.

SRS resources associated with the same spatial relation belong to one SRS group; SRS resources associated with the same panel belong to one SRS group; SRS resources associated with the same beam belong to one SRS group; SRS resources whose associated beams have a QCL relationship belong to one SRS group; or SRS resources with the same number of SRS ports belong to one SRS group.

In an embodiment, the SRS resource in the SRS resource set has at least one of the features described below.

SRS resources with the same number of ports are associated with different spatial relations; SRS resources with the same number of ports are associated with different panels; SRS resources with the same number of ports are associated with different beams; beams associated with SRS resources having the same number of ports have no QCL relationship; or resources belonging to the same SRS group have different numbers of ports.

In an embodiment, for the first communication node, the SRS resource in the SRS resource set has at least one of the features described below.

The number of SRS groups does not exceed a predefined value X1; the number of spatial relations associated with the SRS resource in the SRS resource set does not exceed a predefined value X2; the number of panels associated with the SRS resource in the SRS resource set does not exceed a predefined value X3; the number of different port numbers among numbers of ports associated with the SRS resource in the SRS resource set does not exceed a predefined value X4; the number of SRS resources in the SRS resource set does not exceed a predefined value X5; the number of open-loop power control parameters configured for the SRS resource set does not exceed a predefined value X6; the number of closed-loop power control parameters configured for the SRS resource set does not exceed a predefined value X7; the number of path loss measurement parameters configured for the SRS resource set does not exceed a predefined value X8; the number of open-loop power control parameters configured for all SRS resources in the SRS resource set does not exceed a predefined value X9; the number of closed-loop power control parameters configured for all SRS resources in the SRS resource set does not exceed a predefined value X10; or the number of path loss measurement parameters configured for all SRS resources in the SRS resource set does not exceed a predefined value X11.

In an embodiment, values of X1, X2, X3, X4, X5, X6, X7, X8, X9, X10 and X11 depend on the capability of the first communication node or are predefined values.

In an embodiment, all SRS resources in the SRS resource set are divided into X SRS groups, where X is a positive integer, and SRS resources contained in one of the X SRS groups are determined by SRS resource serial numbers.

In an embodiment, SRS resources whose SRS resource serial numbers are even numbers and SRS resources whose SRS resource serial numbers are odd numbers respectively belong to different SRS groups; or a required number of SRS resources are sequentially allocated for each of the X SRS groups according to an SRS resource serial number order; or SRS resources are allocated in turn for each of the X SRS groups according to an SRS resource serial number order until the allocation is completed.

In an embodiment, the SRS information includes first SRS information and second SRS information, the first SRS information is used to indicate an SRS group, and the second SRS information is used to indicate an SRS resource serial number within an SRS group.

In an embodiment, the second SRS information includes at least one of the features described below.

The second SRS information is indicated jointly with precoding information and the number of layers; a field of precoding information and number of layers includes the second SRS information; or different second SRS information corresponds to different precoding information and different numbers of layers.

In an embodiment, the second SRS information includes the number of SRS ports.

In an embodiment, for the first communication node, the transmission includes at least one of the features described below.

The number of open-loop power control parameters of the transmission does not exceed a predefined value X12; the number of closed-loop power control parameters of the transmission does not exceed a predefined value X13; and the number of path loss measurement parameters of the transmission does not exceed a predefined value X14.

In an embodiment, values of X12, X13 and X14 depend on the capability of the first communication node or are predefined values.

Figure 7:
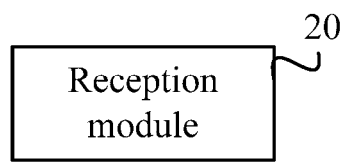
FIG. 7 is a structural diagram of another transmission device according to an embodiment.

FIG. 7 is a structural diagram of another transmission device according to an embodiment. The transmission device may be configured in a receiving terminal. As shown in FIG. 7, the transmission device includes a reception module 20.

The reception module 20 is configured to receive a transmission sent by a first communication node according to at least one of a codebook or a transmission power ratio, and the at least one of the codebook or the transmission power ratio is determined by the first communication node according to a transmission mode of the first communication node.

The transmission device provided by the present embodiment is configured to implement the transmission method of the embodiment shown in FIG. 3. The implementation principle and effects of the transmission device provided by the present embodiment are similar and are not repeated here.

Figure 8:
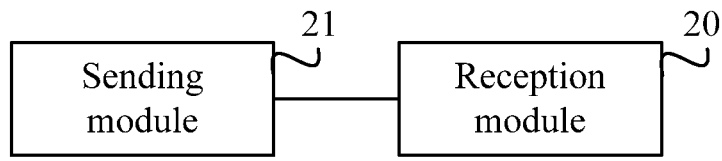
FIG. 8 is a structural diagram of another transmission device according to an embodiment.

In an embodiment, in conjunction with FIG. 7, FIG. 8 is a structural diagram of another transmission device according to an embodiment. The device further includes a sending module 21.

The sending module 21 is configured to send the transmission mode to the first communication node.

In an embodiment, the transmission mode includes at least one of the first mode and the second mode.

In an embodiment, the sending module 21 is further configured to send the scheduling information of the transmission to the first communication node.

In an embodiment, the scheduling information of the transmission is carried in at least one of the following information: radio resource control (RRC) signaling, a media access control control element (MAC CE), or physical layer signaling. The physical layer signaling includes at least one of a physical downlink control channel (PDCCH) or downlink control information (DCI).

In an embodiment, the number M of bits for a field of precoding information and number of layers in the physical layer signaling is determined by at least one of the items described below.

The maximum number of ports of an SRS resource in an SRS resource set corresponding to one of the transmission or the first communication node; the number of ports of an SRS resource corresponding to the transmission; the maximum rank or the maximum number of layers; the number of bits configured by the second communication node and for the field of precoding information and number of layers; or a predefined number of bits for the field of precoding information and number of layers.

In an embodiment, the precoding information and the number of layers indicated by a value of the field of precoding information and number of layers in the physical layer signaling are analyzed by at least one of the information described below.

The number of the ports of the SRS resource corresponding to the transmission; the maximum rank or the maximum number of layers of the first communication node; or the actual maximum rank or the actual maximum number of layers.

In an embodiment, in response to the number of the ports of the SRS resource corresponding to the transmission is less than the maximum number of the ports of the SRS resource in the SRS resource set, the number of necessary indication bits for the precoding information and the number of layers corresponding to the transmission is N, where N is less than or equal to M.

In an embodiment, the M bits for the field of precoding information and number of layers in the physical layer signaling include the N necessary indication bits for the precoding information and the number of layers, and remaining (M−N) bits are preset values or a repetition of the N necessary indication bits for the precoding information and the number of layers.

In an embodiment, the physical layer signaling includes SRS information, and the SRS information is used to indicate an SRS resource in an SRS resource set of the first communication node.

In an embodiment, the SRS resource is associated with at least one of a spatial relation, a panel, or a beam.

In an embodiment, the SRS resource in the SRS resource set is determined according to one of the features described below.

SRS resources associated with the same spatial relation belong to one SRS group; SRS resources associated with the same panel belong to one SRS group; SRS resources associated with the same beam belong to one SRS group; SRS resources whose associated beams have a QCL relationship belong to an SRS group; or SRS resources with the same number of SRS ports belong to one SRS group.

In an embodiment, the SRS resource in the SRS resource set has at least one of the features described below.

SRS resources with the same number of ports are associated with different spatial relations; SRS resources with the same number of ports are associated with different panels; SRS resources with the same number of ports are associated with different beams; beams associated with SRS resources having the same number of ports have no QCL relationship; or resources belonging to the same SRS group have different numbers of ports.

In an embodiment, all SRS resources in the SRS resource set are divided into X SRS groups, where X is a positive integer, and SRS resources contained in one of the X SRS groups are determined by SRS resource serial numbers.

In an embodiment, SRS resources whose SRS resource serial numbers are even numbers and SRS resources whose SRS resource serial numbers are odd numbers respectively belong to different SRS groups; or a required number of SRS resources are sequentially allocated for each of the X SRS groups according to an SRS resource serial number order; or SRS resources are allocated in turn for each of the X SRS groups according to an SRS resource serial number order until allocation is completed.

In an embodiment, the SRS information includes first SRS information and second SRS information, the first SRS information is used to indicate an SRS group, and the second SRS information is used to indicate an SRS resource serial number within an SRS group.

In an embodiment, the second SRS information includes at least one of the features described below.

The second SRS information is indicated jointly with precoding information and the number of layers; a field of precoding information and number of layers includes the second SRS information; or different second SRS information corresponds to different precoding information and different numbers of layers.

In an embodiment, the second SRS information includes the number of SRS ports.

An embodiment of the present application further provides a transmission device. The transmission device includes a processor, which is configured to, when executing a computer program, implement the method provided by any one of the above embodiments of the present application. The transmission device may be the first communication node provided by any embodiment of the present application, or may be the second communication node provided by any embodiment of the present application, which is not limited in the present application.

The embodiments described below respectively provide schematic diagrams of structures in which the transmission devices are a base station and a UE.

Figure 9:
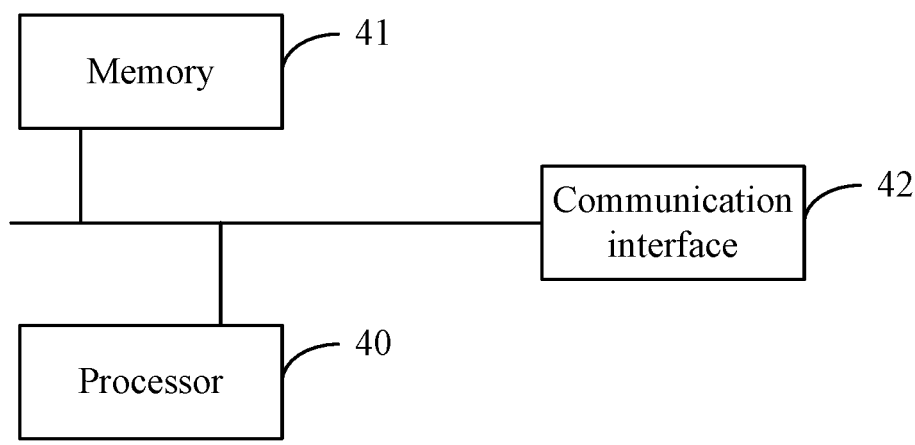
FIG. 9 is a structural diagram of a base station according to an embodiment.

FIG. 9 is a structural diagram of a base station according to an embodiment. As shown in FIG. 9, the base station includes a processor 40, a memory 41 and a communication interface 42. The number of processors 40 in the base station may be one or more, and one processor 40 is used as an example in FIG. 9. The processor 40, the memory 41 and the communication interface 42 in the base station may be connected through a bus or in other manners. In FIG. 9, the connection through the bus is used as an example. The bus represents one or more of several types of bus structures, including a memory bus or a local bus of any bus structure used by a memory controller, a peripheral bus, an accelerated graphics port, a processor, or a structure of multiple buses.

As a computer readable storage medium, the memory 41 may be configured to store software programs, computer executable programs and modules, such as program instructions/modules corresponding to the transmission method in the embodiments of the present application. The processor 40 runs the software programs, instructions and modules stored in the memory 41 to execute at least one function application and data processing of the base station, that is, to implement the transmission method described above.

The memory 41 may include a program storage region and a data storage region. The program storage region may store an operating system and an application program required by at least one function; and the data storage region may store data created depending on use of a terminal. Moreover, the memory 41 may include a high-speed random access memory, and may further include a nonvolatile memory such as at least one disk memory component, flash memory component or another nonvolatile solid state memory component. In some examples, the memory 41 may include memories which are remotely disposed with respect to the processor 40, and these remote memories may be connected to the base station via a network. The examples of the preceding network include, but are not limited to, the Internet, an intranet, a local area network, a mobile communication network and a combination thereof.

The communication interface 42 may be configured to receive and send data.

Figure 10:
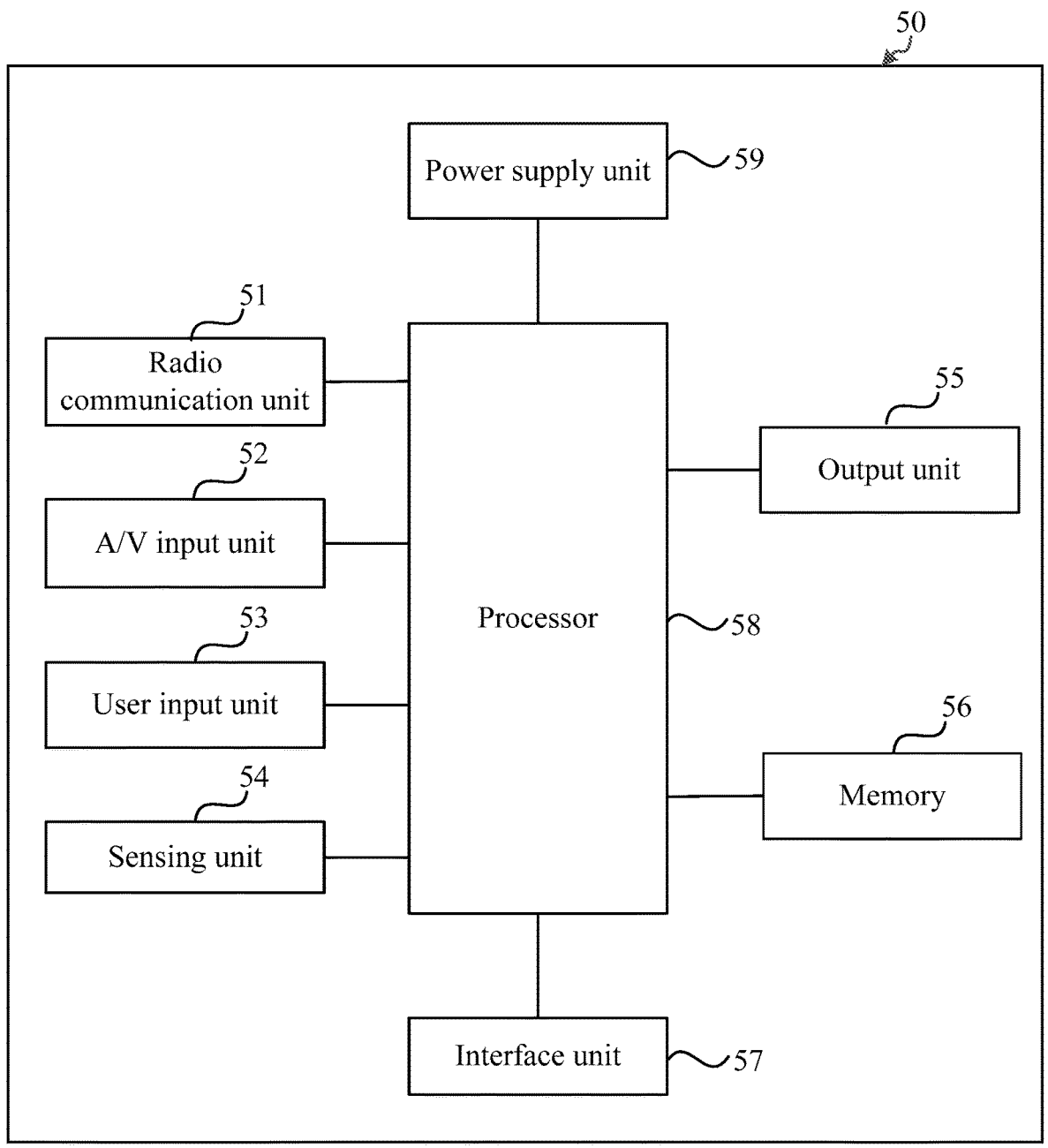
FIG. 10 is a structural diagram of a UE according to an embodiment.

FIG. 10 is a structural diagram of a UE according to an embodiment. The UE may be implemented in various forms. The UE in the present application includes, but is not limited to, a mobile terminal device such as a mobile phone, a smart phone, a notebook computer, a digital broadcast receiver, a personal digital assistant (PDA), a portable device (PAD), a portable multimedia player (PMP), a navigation device, a vehicle-mounted terminal device, a vehicle-mounted display terminal, and a vehicle-mounted electronic rearview mirror, or a fixed terminal device such as a digital television (TV) and a desktop computer.

As shown in FIG. 10, the UE 50 may include a radio communication unit 51, an audio/video (A/V) input unit 52, a user input unit 53, a sensing unit 54, an output unit 55, a memory 56, an interface unit 57, a processor 58, a power supply unit 59, etc. FIG. 10 illustrates the UE including various assemblies, and it is not required to implement all the illustrated assemblies. More or fewer assemblies may be implemented instead.

In the embodiment, the radio communication unit 51 allows radio communication between the UE 50 and a base station or a network. The A/V input unit 52 is configured to receive audio or video signals. The user input unit 53 may generate key input data according to commands input by the user to control various operations of the UE 50. The sensing unit 54 detects the current state of the UE 50, the location of the UE 50, the presence or absence of the user's touch input to the UE 50, the orientation of the UE 50, the acceleration or deceleration movement and direction of the UE 50 and so on, and generates commands or signals for controlling the operation of the UE 50. The interface unit 57 serves as an interface through which at least one external device may be connected to the UE 50. The output unit 55 is configured to provide output signals in a visual, audio, and/or tactile manner. The memory 56 may store software programs for processing and controlling operations executed by the processor 58, etc., or may temporarily store data that has been output or will be output. The memory 56 may include at least one type of storage media. Moreover, the UE 50 may cooperate with a network storage device that performs the storage function of the memory 56 through network connection. The processor 58 is generally configured to control an overall operation of the UE 50. The power supply unit 59 receives external power or internal power under the control of the processor 58 and provides the appropriate power required by operating various members and assemblies.

The processor 58 runs the programs stored in the memory 56 to execute at least one function application and data processing, for example, to implement the transmission method provided by the embodiments of the present application.

An embodiment of the present application further provides a computer readable storage medium, which is configured to store a computer program which, when executed by a processor, implements the method provided by any one of the embodiments of the present application.

The computer storage medium of the embodiments of the present application may adopt any combination of one or more computer readable media. The computer readable medium may be a computer readable signal medium or a computer readable storage medium. The computer readable storage medium may be, for example, but is not limited to, an electrical, magnetic, optical, electromagnetic, infrared or semiconductor system, device or component, or any combination thereof. The computer readable storage medium includes (a non-exhaustive list): an electrical connection having one or more wires, a portable computer disk, a hard disk, a random access memory (RAM), a read-only memory (ROM), an electrically erasable programmable read only memory (EPROM), a flash memory, an optical fiber, a portable compact disk read-only memory (CD-ROM), an optical memory component, a magnetic memory component, or any suitable combination thereof. In this application, the computer readable storage medium may be any tangible medium containing or storing a program. The program may be used by an instruction execution system, device or component, or used in conjunction with the instruction execution system, device or component.

The computer readable signal medium may include a data signal propagated in baseband or as part of a carrier wave, and the data signal bears computer readable program codes. Such a propagated data signal may take various forms that include, but are not limited to, an electromagnetic signal, an optical signal, or any appropriate combination thereof. The computer readable signal medium may further be any computer readable medium other than the computer readable storage medium. The computer readable medium may send, propagate, or transmit the program used by the instruction execution system, device or component, or used in conjunction with the instruction execution system, device or component.

The program codes contained on the computer readable medium may be transmitted on any suitable medium, including, but not limited to, radio, wire, optical cable, radio frequency (RF), etc., or any suitable combination thereof.

Computer program codes for executing the operations of the present application may be written in one or more programming languages or a combination of multiple programming languages. The programming languages include object-oriented programming languages such as Java, Smalltalk, C++, Ruby and Go, as well as conventional procedural programming languages such as "C" or similar programming languages. The program codes may be executed entirely on a user computer, partially on a user computer, as a separate software package, partially on a user computer and partially on a remote computer, or entirely on a remote computer or a server. In the case relating to a remote computer, the remote computer may be connected to a user computer via any kind of network including a local area network (LAN) or a wide area network (WAN), or may be connected to an external computer (for example, via the Internet through an Internet service provider).

The term user terminal encompasses any suitable type of radio user devices, such as a mobile phone, a portable data processing device, a portable web browser, or a vehicle-mounted mobile station.

Generally, various embodiments of the present application may be implemented in hardware or special purpose circuits, software, logic or any combination thereof. For example, some aspects may be implemented in hardware while other aspects may be implemented in firmware or software that may be executed by a controller, a microprocessor, or other computing devices, although the present application is not limited thereto.

The embodiments of the present application may be implemented by a data processor of a mobile device executing computer program instructions, for example in a processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in the drawings of the present application may represent program steps, or may represent interconnected logic circuits, modules, and functions, or may represent a combination of program steps and logic circuits, modules, and functions. The computer programs may be stored on a memory. The memory may be of any type suitable to the local technical environment and may be implemented using any suitable data storage technology such as, but not limited to, a read-only memory (ROM), a random access memory (RAM), an optical memory device and system (digital video disc (DVD) or CD), and the like. The computer readable medium may include a non-transitory storage medium. The data processor may be of any type suitable to the local technical environment, such as, but is not limited to, a general purpose computer, a special purpose computer, a microprocessor, a digital signal processing (DSP), an application specific integrated circuit (ASIC), a field-programmable gate array (FPGA), and a processor based on a multi-core processor architecture.

What is claimed is:

1. A transmission method, comprising:
   determining a transmission mode of a first communication node;
   determining, according to the transmission mode, a transmission power ratio; and
   sending a transmission according to the transmission power ratio,
   wherein the transmission mode comprises one of a first mode or a second mode, and
   wherein determining the transmission power ratio according to the transmission mode comprises:
   in response to the transmission mode being the second mode, determining, according to a power capability of a transmitted precoding matrix indicator (TPMI) of the transmission, the transmission power ratio; and
   in response to the transmission mode being the first mode, determining, according to a number of ports of a sounding reference signal (SRS) resource corresponding to the transmission, the transmission power ratio,
   the method further comprising:
   receiving scheduling information of the transmission from a second communication node, wherein the scheduling information of the transmission is carried in physical layer signaling, wherein the physical layer signaling comprises downlink control information, DCI, and wherein a number M of bits for a field of precoding information and number of layers in the physical layer signaling is determined by a maximum number of ports of an SRS resource in an SRS resource set corresponding to the transmission,
   wherein the physical layer signaling comprises SRS information, and the SRS information is used to indicate an SRS resource in an SRS resource set of the first communication node, wherein for the first communication node, the SRS resource in the SRS resource set has following features:
  a number of spatial relations associated with the SRS resource in the SRS resource set not exceeding a predefined value X2; and
  a number of SRS resources in the SRS resource set not exceeding a predefined value X5;
wherein X2 and X5 are all positive integers, and
wherein a value of X5 depends on a capability of the first communication node, and a value of X2 is a predefined value.

2. The method according to claim 1, wherein determining the transmission mode of the first communication node comprises:
  receiving the transmission mode from a second communication node.

3. The method according to claim 1, wherein the power capability comprises:
  whether to reach maximum transmission power of the first communication node.

4. The method according to claim 1, wherein the precoding information and the number of layers indicated by a value of the field of precoding information and number of layers in the physical layer signaling are analyzed based on the following information:
  the number of the ports of the SRS resource corresponding to the transmission; and
  a maximum number of layers of the first communication node.

5. A transmission device, comprising: a processor; wherein the processor is configured, when executing a computer program, to:
  determine a transmission mode of a first communication node;
  determine, according to the transmission mode, a transmission power ratio; and
  send a transmission according to the transmission power ratio,
wherein the transmission mode comprises one of a first mode or a second mode, and
wherein determining the transmission power ratio according to the transmission mode comprises:
  in response to the transmission mode being the second mode, determining, according to a power capability of a transmitted precoding matrix indicator (TPMI) of the transmission, the transmission power ratio; and
  in response to the transmission mode being the first mode, determining, according to a number of ports of a sounding reference signal (SRS) resource corresponding to the transmission, the transmission power ratio,
the processor further configured to:
  receive scheduling information of the transmission from a second communication node, wherein the scheduling information of the transmission is preferably carried in physical layer signaling, wherein the physical layer signaling comprises downlink control information (DCI), and wherein a number M of bits for a field of precoding information and number of layers in the physical layer signaling is determined by a maximum number of ports of an SRS resource in an SRS resource set corresponding to the transmission,
  wherein the physical layer signaling comprises SRS information, and the SRS information is used to indicate an SRS resource in an SRS resource set of the first communication node,
  wherein for the first communication node, the SRS resource in the SRS resource set has following features:
    a number of spatial relations associated with the SRS resource in the SRS resource set not exceeding a predefined value X2; and
    a number of SRS resources in the SRS resource set not exceeding a predefined value X5;
  wherein X2 and X5 are all positive integers, and
  wherein a value of X5 depends on a capability of the first communication node, and a value of X2 is a predefined value.

6. The transmission device according to claim 5, wherein the processor is further configured to receive the transmission mode from a second communication node when determining the transmission mode of the first communication node.

7. The transmission device according to claim 5, wherein the power capability comprises:
  whether to reach maximum transmission power of the first communication node.

8. The transmission device according to claim 5, wherein the precoding information and the number of layers indicated by a value of the field of precoding information and number of layers in the physical layer signaling are analyzed based on the following information:
  the number of the ports of the SRS resource corresponding to the transmission; and
  a maximum number of layers of the first communication node.

9. A transmission method, comprising:
  receiving a transmission sent by a first communication node according to a transmission power ratio;
  wherein the transmission power ratio is determined by the first communication node according to a transmission mode of the first communication node; and
  wherein the transmission mode comprises a first mode or a second mode, and
  wherein determining the transmission power ratio according to the transmission mode comprises:
  in response to the transmission mode being the second mode, determining, according to a power capability of a transmitted precoding matrix indicator (TPMI) of the transmission, the transmission power ratio; and
  in response to the transmission mode being the first mode, determining, according to a number of ports of a sounding reference signal (SRS) resource corresponding to the transmission, the transmission power ratio,
the method further comprising:
  transmitting scheduling information of the transmission to the first communication node, wherein the scheduling information of the transmission is carried in physical layer signaling, wherein the physical layer signaling comprises downlink control information (DCI), and wherein a number M of bits for a field of precoding information and number of layers in the physical layer signaling is determined by a maximum number of ports of an SRS resource in an SRS resource set corresponding to the transmission,
  wherein the physical layer signaling comprises SRS information, and the SRS information is used to indicate an SRS resource in an SRS resource set of the first communication node,
  wherein, for the first communication node, the SRS resource in the SRS resource set has the following features:

a number of spatial relations associated with the SRS resource in the SRS resource set not exceeding a predefined value X2; and a number of SRS resources in the SRS resource set not exceeding a predefined value X5;

wherein X2 and X5 are all positive integers, and wherein a value of X5 depends on a capability of the first communication node, and a value of X2 is a predefined value.

10. The method according to claim 9, further comprising: sending the transmission mode to the first communication node.

11. The method according to claim 9, wherein the power capability comprises:

whether to reach maximum transmission power of the first communication node.

12. The method according to claim 9, wherein the precoding information and the number of layers indicated by a value of the field of precoding information and number of layers in the physical layer signaling are analyzed based on the following information:

the number of the ports of the SRS resource corresponding to the transmission; and a maximum number of layers of the first communication node.

13. A transmission device, comprising: a processor; wherein the processor is configured, when executing a computer program, to:

receive a transmission sent by a first communication node according to a transmission power ratio;

wherein the transmission power ratio is determined by the first communication node according to a transmission mode of the first communication node; and wherein the transmission mode comprises a first mode or a second mode, and wherein determining the transmission power ratio according to the transmission mode comprises:

in response to the transmission mode being the second mode, determining, according to a power capability of a transmitted precoding matrix indicator (TPMI) of the transmission, the transmission power ratio; and in response to the transmission mode being the first mode, determining, according to a number of ports of a sounding reference signal (SRS) resource corresponding to the transmission, the transmission power ratio, the processor further configured to:

transmit scheduling information of the transmission to the first communication node, wherein the scheduling information of the transmission is carried in physical layer signaling, wherein the physical layer signaling comprises downlink control information (DCI), and wherein a number M of bits for a field of precoding information and number of layers in the physical layer signaling is determined by a maximum number of ports of an SRS resource in an SRS resource set corresponding to the transmission, wherein the physical layer signaling comprises SRS information, and the SRS information is used to indicate an SRS resource in an SRS resource set of the first communication node, wherein, for the first communication node, the SRS resource in the SRS resource set has following features:

a number of spatial relations associated with the SRS resource in the SRS resource set not exceeding a predefined value X2; and a number of SRS resources in the SRS resource set not exceeding a predefined value X5;

wherein X2 and X5 are all positive integers, and wherein a value of X5 depends on a capability of the first communication node, and a value of X2 is a predefined value.

14. The transmission device according to claim 13, wherein the processor is further configured to send the transmission mode to the first communication node.

\* \* \* \* \*